US011659574B2

(12) United States Patent
Lei et al.

(10) Patent No.: US 11,659,574 B2
(45) Date of Patent: May 23, 2023

(54) BWP CONFIGURATIONS FOR UES HAVING DIFFERENT CAPABILITIES

(71) Applicant: QUALCOMM Incorporated, San Diego, CA (US)

(72) Inventors: Jing Lei, San Diego, CA (US); Muhammad Nazmul Islam, Littleton, MA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/871,879

(22) Filed: Jul. 22, 2022

(65) Prior Publication Data

US 2023/0074775 A1 Mar. 9, 2023

Related U.S. Application Data

(60) Provisional application No. 63/234,674, filed on Aug. 18, 2021.

(51) Int. Cl.
*H04W 72/04* (2009.01)
*H04L 5/14* (2006.01)
*H04W 56/00* (2009.01)
*H04W 72/044* (2023.01)

(52) U.S. Cl.
CPC ............ *H04W 72/048* (2013.01); *H04L 5/14* (2013.01); *H04W 56/001* (2013.01); *H04W 72/044* (2013.01)

(58) Field of Classification Search
CPC ............ H04W 72/048; H04W 56/001; H04W 72/044; H04L 5/14
See application file for complete search history.

(56) References Cited

U.S. PATENT DOCUMENTS

2020/0228966 A1* 7/2020 Xu ...................... H04W 72/042
2020/0328864 A1* 10/2020 Choi ...................... H04L 5/001
(Continued)

FOREIGN PATENT DOCUMENTS

AU 2018364988 B2 4/2021
WO 2020146848 A1 7/2020
(Continued)

OTHER PUBLICATIONS

International Search Report and Wri I I En Opinion - PCT/US2022/040344 - ISA/EPO - 2022-11-03 K2107667WO).
(Continued)

*Primary Examiner* — Kyaw Z Soe
(74) *Attorney, Agent, or Firm* — Procopio Cory Hargreaves & Savitch LLP; Nerrie M. Zohn

(57) ABSTRACT

A user equipment (UE) having a first capability associated with a lower maximum UE bandwidth than a second capability performs at least a part of initial access based on an initial downlink bandwidth part (BWP) that is shared among UEs having the first capability and UEs having the second capability. The UE switches, after the initial access, to an active downlink BWP and an active uplink BWP that are dedicated for the UEs having the first capability to perform random access, paging, system acquisition, measurement and data communication procedures.

30 Claims, 19 Drawing Sheets

(56) References Cited

U.S. PATENT DOCUMENTS

2020/0344595 A1* 10/2020 Chen ................. H04W 8/24
2021/0045159 A1* 2/2021 Lei ................. H04W 72/042

FOREIGN PATENT DOCUMENTS

WO   2020194240 A1   10/2020
WO   2021146864 A1   7/2021

OTHER PUBLICATIONS

Moderator (NTT Docomo, Inc): "Summary on [102-e-NR-RedCap-04]", R1-200xxxx, 3GPP TSG RAN WG1 #102-e, e-Meeting, Aug. 17- 28, 2020, 11 Pages.

Qualcomm Incorporated: "BW Reduction for RedCap UE", 3GPP TSG RAN WG1 Meeting #106, R1-2107351, 3rd Generation Partnership Project (3GPP), Mobile Competence Centre, 650, Route Des Lucioles, F-06921 Sophia-Antipolis Cedex, France, vol. Ran WG1, No. e-Meeting, Aug. 16, 2021-Aug. 27, 2021, Aug. 7, 2021, 24 p. XP052038299, Sections 1, 2.1.1, 2.2,2.3, p. 1 - p. 10.

Xiaomi: "Discussion on the Remaining Issues of Reduced Maximum UE Bandwidth for RedCap", 3GPP TSG RAN WG1 Meeting #106e, R1-2107926, 3rd Generation Partnership Project (3GPP), Mobile Competence Centre, 650, Route Des Lucioles, F-06921 Sophia-Antipolis Cedex, France, vol. Ran WG1, No. e-Meeting, Aug. 16, 2021-Aug. 27, 2021, Aug. 6, 2021, 9 Pages, XP052033718, Section 2.2.2.

* cited by examiner

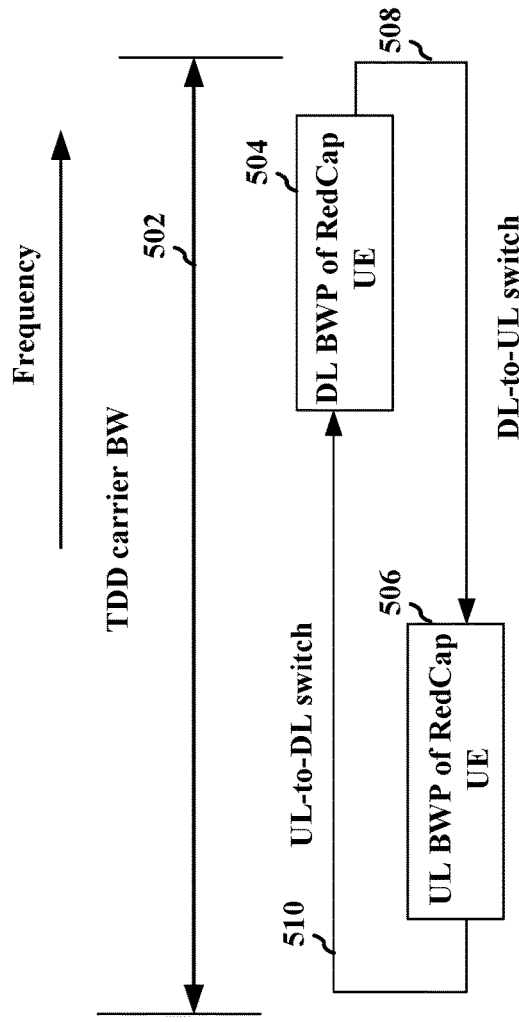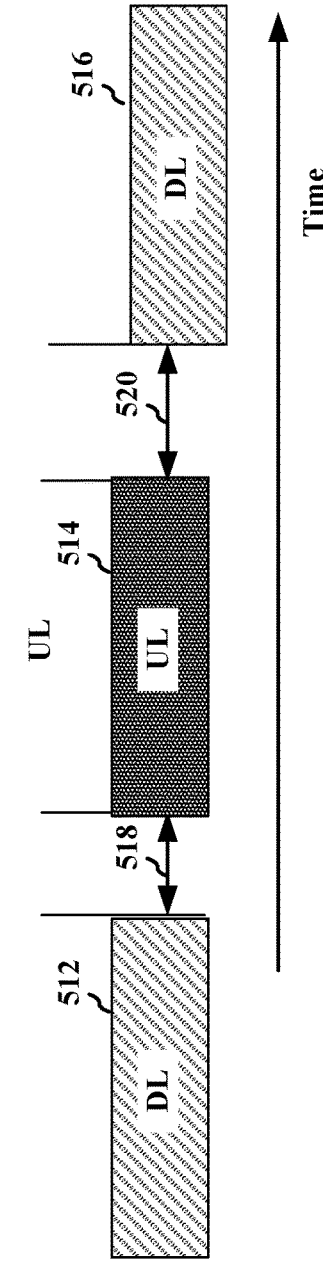
FIG. 5A
FIG. 5B

BWP CONFIGURATIONS FOR UES HAVING DIFFERENT CAPABILITIES

CROSS REFERENCE TO RELATED APPLICATION(S)

This application claims the benefit of and priority to U.S. Provisional Application Ser. No. 63/234,674, entitled "BWP Configurations for UEs Having Different Capabilities" and filed on Aug. 18, 2021, which is expressly incorporated by reference herein in its entirety.

TECHNICAL FIELD

The present disclosure relates generally to communication systems, and more particularly, to wireless communication based on a bandwidth part (BWP).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. The summary neither identifies key or critical elements of all aspects nor delineates the scope of any or all aspects. Its sole purpose is to present some concepts of one or more aspects in a simplified form as a prelude to the more detailed description that is presented later.

In addition to higher capability devices wireless communication may support reduced capability devices. In some examples, a reduced capability UE may have a reduced transmission or reception bandwidth in comparison to other UEs. Aspects presented herein provide for configurations and signaling support for reduced capability UEs that enable joint optimization of DL/UL BWP configurations, co-existence of different UE capabilities, power savings for reduced capability UEs, mitigation of resource fragmentation on DL/UL, and/or signaling overhead reduction.

In some aspects, UEs having different levels of capabilities, such as reduced capability UEs and non-reduced (or higher) capability UEs, may share an initial DL BWP for initial access. In some aspects, a separate initial BWP, e.g., a dedicated initial downlink BWP and/or dedicated initial uplink BWP, may be provided for UEs with a reduced bandwidth. The aspects presented herein may provide a configuration of BWPs for and after initial access that support reduced bandwidths according to the reduced capability UEs while maintaining flexibility in configuring bandwidth for higher capability UEs.

In an aspect of the disclosure, a method, a computer-readable medium, and an apparatus are provided for wireless communication at a user equipment (UE) having a first capability associated with a lower maximum UE bandwidth than a second capability. The apparatus performs at least a part of initial access based on an initial downlink bandwidth part (BWP) that is shared among UEs having the first capability and UEs having the second capability. The apparatus switches, after the initial access, to an active downlink BWP and an active uplink BWP that are dedicated for the UEs having the first capability.

In another aspect of the disclosure, a method, a computer-readable medium, and an apparatus are provided for wireless communication at a network entity. The apparatus performs initial access with a UE having a first capability associated with a lower maximum UE bandwidth than a second capability, at least a part of the initial access being based on an initial downlink BWP that is shared among UEs having the first capability and UEs having the second capability. The apparatus switches, for communication with the UE, to an active downlink BWP and an active uplink BWP that are dedicated for the UEs having the first capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates an example of a downlink (DL) and uplink (UL) BWP in a carrier bandwidth in accordance with various aspects presented herein.

FIG. 5B illustrates a time diagram showing a guard period for switching between an UL BWP and a DL BWP in accordance with various aspects presented herein.

DETAILED DESCRIPTION

Figure 1:
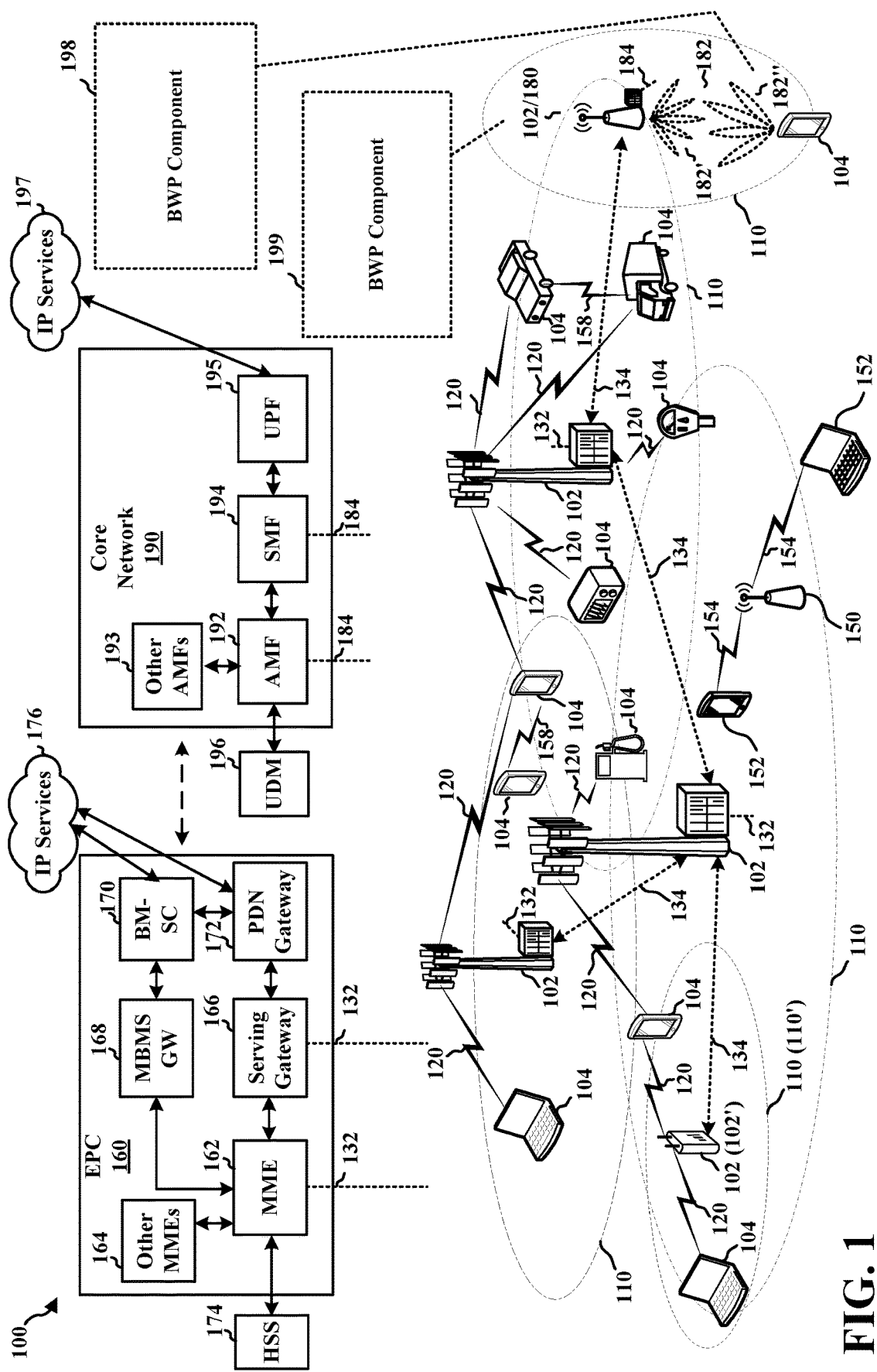
FIG. 1 is a diagram illustrating an example of a wireless communications system and an access network in accordance with various aspects presented herein.

In addition to higher capability devices wireless communication may support reduced capability devices. In some examples, a reduced capability UE may have reduced transmission bandwidth or reception bandwidth than other UEs. Aspects presented herein provide for configurations and signaling support for reduced capability UEs that enables joint optimization of DL/UL BWP configurations, co-existence of different UE capabilities, power savings for reduced capability UEs, mitigation of resource fragmentation on DL/UL, and/or signaling overhead reduction. In some aspects, UEs having different levels of capabilities, such as reduced capability UEs and non-reduced (or higher) capability UEs, may share an initial DL BWP and CORESET 0 for initial access. The UEs may monitor the resources of CORESET 0 to receive system information that enable the UEs to perform initial access, for example. In some aspects, a shared CORESET 0, e.g., and shared system information block (SIB) may carry information for UEs having a larger bandwidth capability and UEs having a reduced bandwidth capability. In some aspects, a separate initial BWP, e.g., a dedicated initial downlink BWP and/or dedicated initial uplink BWP, may be provided for UEs with a reduced bandwidth. In some aspects, a reduced capability UE may transmit a random access message, such as a random access preamble using the dedicated initial BWP. The aspects presented herein may provide a configuration of BWPs for and after initial access that support reduced bandwidths according to the reduced capability UEs while maintaining flexibility in configuring bandwidth for higher capability UEs.

The detailed description set forth below in connection with the drawings describes various configurations and is not intended to represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, etc., or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations, and/or use cases may come about in many different arrangements and scenarios. Aspects, implementations, and/or use cases described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Aspects, implementations, and/or use cases may range a spectrum from chip-level or modular components to non-modular, non-chip-level implementations and further to aggregate, distributed, or original equipment manufacturer (OEM) devices or systems incorporating one or more aspects of the techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In some aspects, a UE 104 may have having a first capability associated with a lower maximum UE bandwidth than a second capability. The UE may be a reduced capability UE, in some aspects. The UE 104 may include a BWP component 198 configured to perform at least a part of initial access with a base station 102 or 180 based on an initial downlink BWP that is shared among UEs having the first capability and UEs having the second capability and to switch to an active downlink BWP and an active uplink BWP that are dedicated for the UEs having the first capability.

The base station 102 or 180 may include a BWP component 199 configured to perform initial access with a UE 104 having a first capability associated with a lower maximum UE bandwidth than a second capability, at least a part of the initial access being based on an initial downlink BWP that is shared among UEs having the first capability and UEs having the second capability. The base station 102 or 180 may be further configured to switch, for communication with the UE 104, to an active downlink BWP and an active uplink BWP that are dedicated for the UEs having the first capability. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 19:
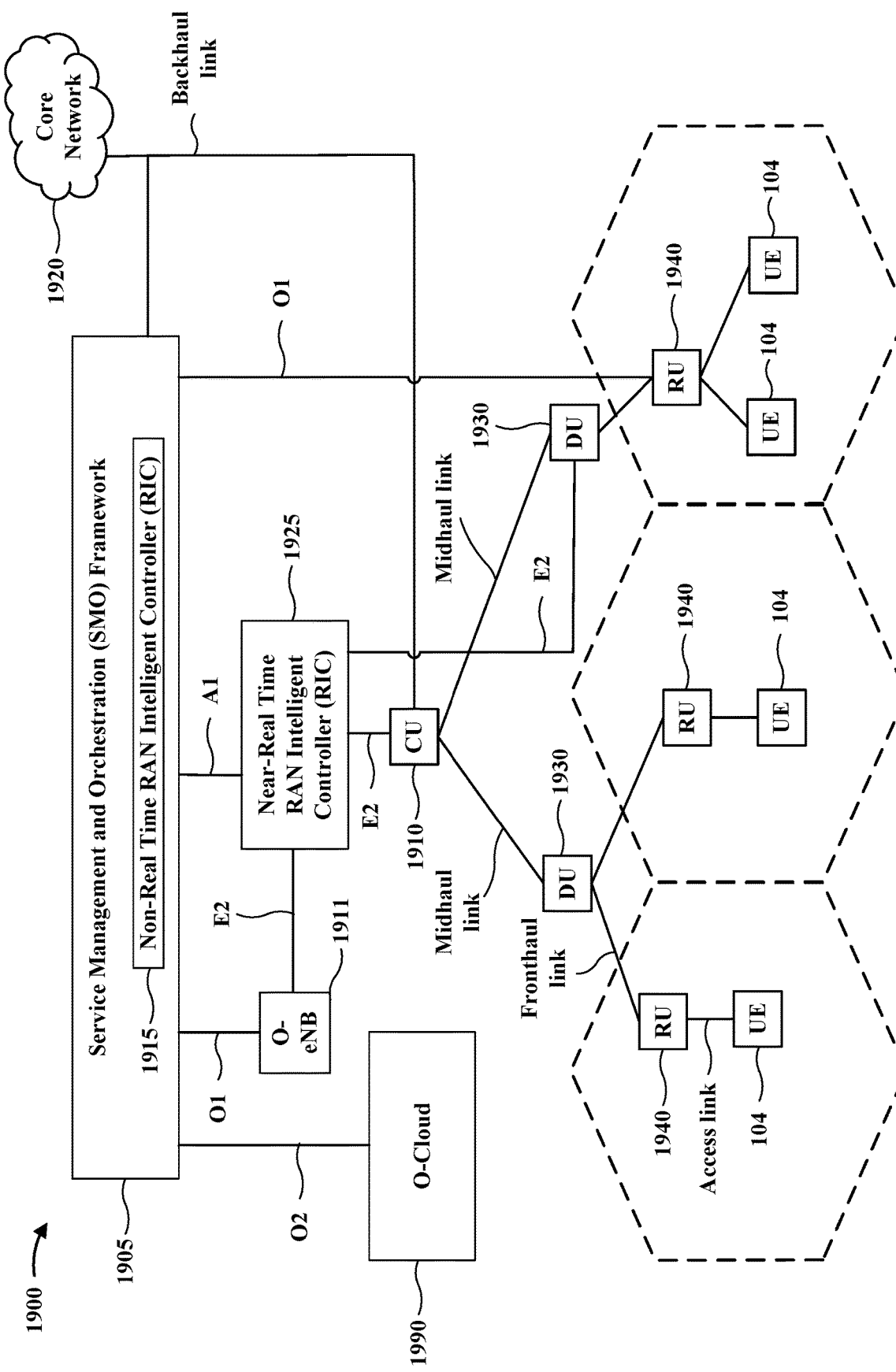
FIG. 19 shows a diagram illustrating an example disaggregated base station architecture in accordance with various aspects presented herein.

FIG. 19 shows a diagram illustrating an example disaggregated base station 1900 architecture. The disaggregated base station 1900 architecture may include one or more central units (CUs) 1910 that can communicate directly with a core network 1920 via a backhaul link, or indirectly with the core network 1920 through one or more disaggregated base station units (such as a Near-Real Time (Near-RT) RAN Intelligent Controller (RIC) 1925 via an E2 link, or a Non-Real Time (Non-RT) RIC 1915 associated with a Service Management and Orchestration (SMO) Framework 1905, or both). A CU 1910 may communicate with one or more distributed units (DUs) 1930 via respective midhaul links, such as an F1 interface. The DUs 1930 may communicate with one or more radio units (RUs) 1940 via respective fronthaul links. The RUs 1940 may communicate with respective UEs 104 via one or more radio frequency (RF) access links. In some implementations, the UE 104 may be simultaneously served by multiple RUs 1940.

Each of the units, i.e., the CUs 1910, the DUs 1930, the RUs 1940, as well as the Near-RT RICs 1925, the Non-RT RICs 1915 and the SMO Framework 1905, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1910 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1910. The CU 1910 may be configured to handle user plane functionality (i.e., Central Unit-User Plane (CU-UP)), control plane functionality (i.e., Central Unit-Control Plane (CU-CP)), or a combination thereof. In some implementations, the CU 1910 can be logically split into one or more CU-UP units and one or more CU-CP units. The CU-UP unit can communicate bidirectionally with the CU-CP unit via an interface, such as the E1 interface when implemented in an O-RAN configuration. The CU 1910 can be implemented to communicate with the DU 1930, as necessary, for network control and signaling.

The DU 1930 may correspond to a logical unit that includes one or more base station functions to control the operation of one or more RUs 1940. In some aspects, the DU 1930 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1930 may further host one or more low PHY layers. Each layer (or module) can be implemented with an interface configured to communicate signals with other layers (and modules) hosted by the DU 1930, or with the control functions hosted by the CU 1910.

Lower-layer functionality can be implemented by one or more RUs 1940. In some deployments, an RU 1940, controlled by a DU 1930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1940 can be implemented to handle over the air (OTA) communication with one or more UEs 104. In some implementations, real-time and non-real-time aspects of control and user plane communication with the RU(s) 1940 can be controlled by the corresponding DU 1930. In some scenarios, this configuration can enable the DU(s) 1930 and the CU 1910 to be implemented in a cloud-based RAN architecture, such as a vRAN architecture.

The SMO Framework 1905 may be configured to support RAN deployment and provisioning of non-virtualized and virtualized network elements. For non-virtualized network elements, the SMO Framework 1905 may be configured to support the deployment of dedicated physical resources for RAN coverage requirements which may be managed via an operations and maintenance interface (such as an O1 interface). For virtualized network elements, the SMO Framework 1905 may be configured to interact with a cloud computing platform (such as an open cloud (O-Cloud) 1990) to perform network element life cycle management (such as to instantiate virtualized network elements) via a cloud computing platform interface (such as an O2 interface). Such virtualized network elements can include, but are not limited to, CUs 1910, DUs 1930, RUs 1940 and Near-RT RICs 1925. In some implementations, the SMO Framework 1905 can communicate with a hardware aspect of a 4G RAN, such as an open eNB (O-eNB) 1911, via an O1 interface. Additionally, in some implementations, the SMO Framework 1905 can communicate directly with one or more RUs 1940 via an O1 interface. The SMO Framework 1905 also may include a Non-RT RIC 1915 configured to support functionality of the SMO Framework 1905.

The Non-RT RIC 1915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1925. The Non-RT RIC 1915 may be coupled to or communicate with (such as via an A1 interface) the Near-RT RIC 1925. The Near-RT RIC 1925 may be configured to include a logical function that enables near-real-time control and optimization of RAN elements and resources via data collection and actions over an interface (such as via an E2 interface) connecting one or more CUs 1910, one or more DUs 1930, or both, as well as an O-eNB, with the Near-RT RIC 1925.

In some implementations, to generate AI/ML models to be deployed in the Near-RT RIC 1925, the Non-RT RIC 1915 may receive parameters or external enrichment information from external servers. Such information may be utilized by the Near-RT RIC 1925 and may be received at the SMO Framework 1905 or the Non-RT RIC 1915 from non-network data sources or from network functions. In some examples, the Non-RT MC 1915 or the Near-RT MC 1925 may be configured to tune RAN behavior or performance. For example, the Non-RT MC 1915 may monitor long-term trends and patterns for performance and employ AI/ML models to perform corrective actions through the SMO Framework 1905 (such as reconfiguration via O1) or via creation of RAN management policies (such as A1 policies).

Figure 2:
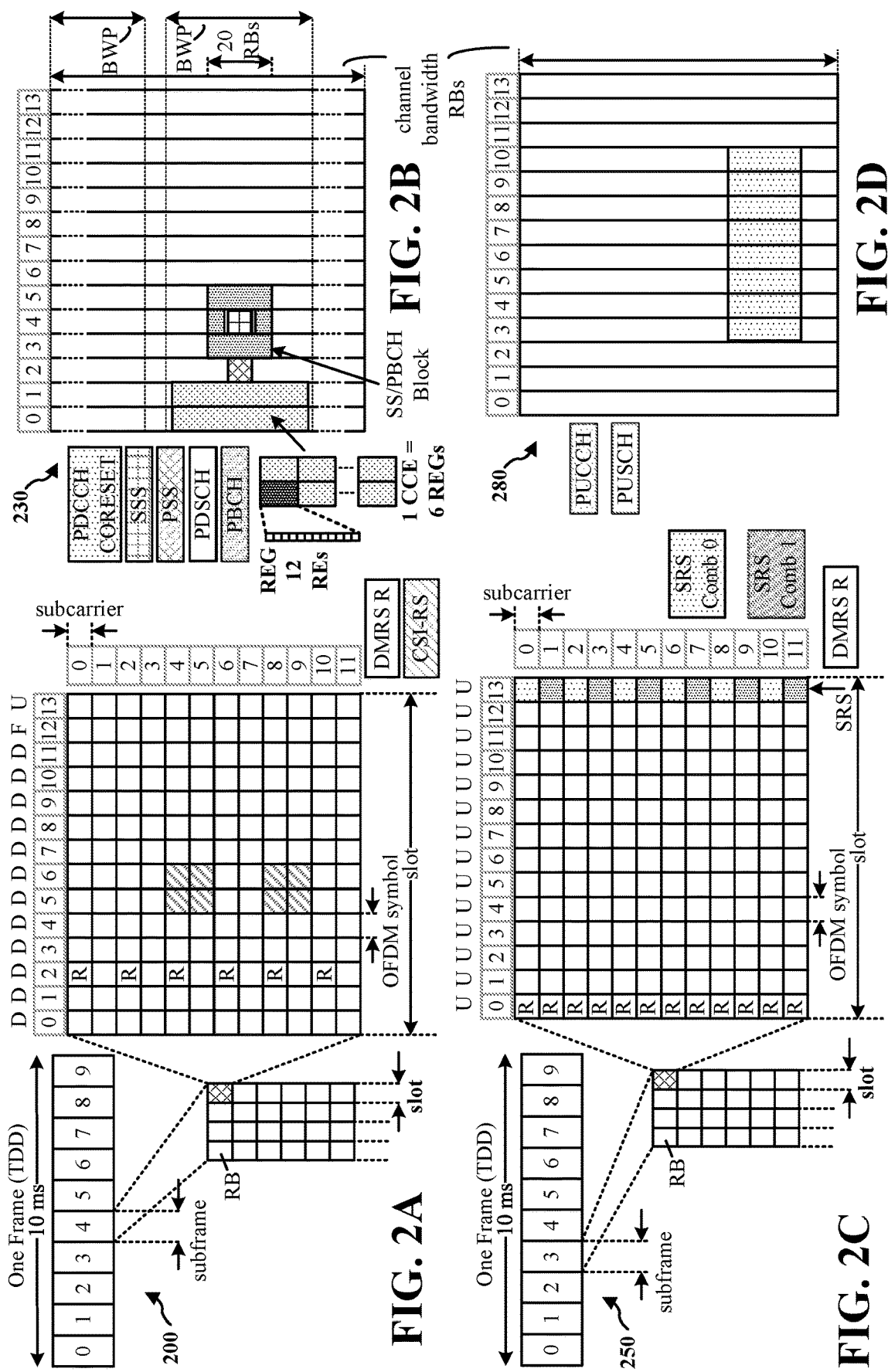
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
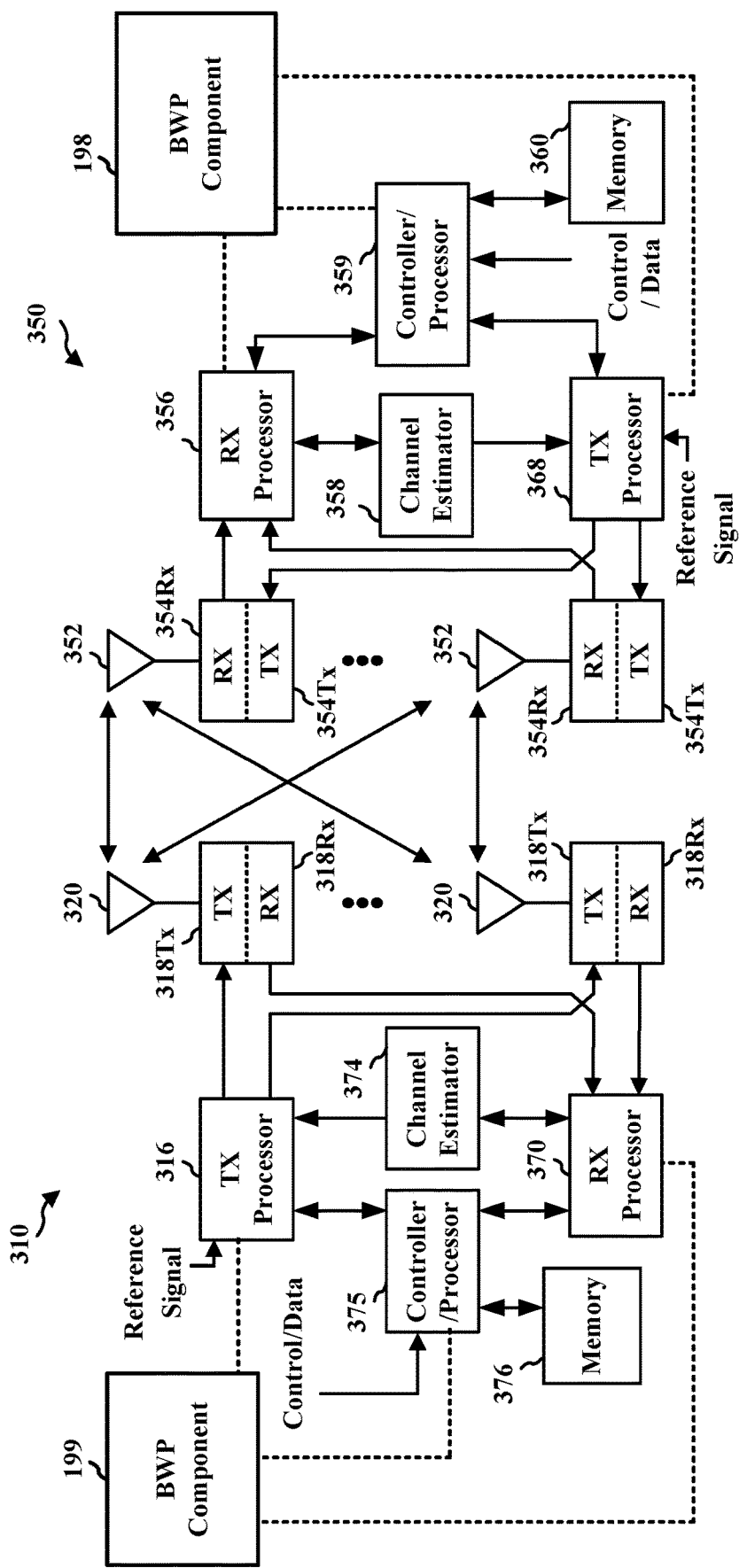
FIG. 3 is a diagram illustrating an example of a base station and user equipment (UE) in an access network in accordance with various aspects presented herein.

FIG. 3 is a block diagram of a base station 310 in communication with a UE 350 in an access network. In the DL, IP packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BWP component 198 of FIG. 1.

At least one of the TX processor 316, the RX processor 370, and the controller/processor 375 may be configured to perform aspects in connection with the BWP component 199 of FIG. 1.

In addition to higher capability devices wireless communication may support reduced capability devices. Among others, examples of higher capability devices include premium smartphones, vehicle-to-everything (V2X) devices, URLLC devices, eMBB devices, etc. The reduced capability devices may include lower capability devices and mid-range devices and use cases. Among other examples, reduced capability devices may include wearables, industrial wireless sensor networks (IWSN), surveillance cameras, low-end smartphones, etc. Communication systems, such as an NR communication system, may support both higher capability devices and reduced capability devices. A reduced capability device may be referred to as a RedCap device, NR light device, a low-tier device, a lower tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In some examples, a reduced capability UE may have reduced transmission bandwidth or reception bandwidth than other UEs. For instance, a reduced capability UE may have an operating bandwidth between 5 MHz and 20 MHz for both transmission and reception, in contrast to other UEs which may have a bandwidth of up to 100 MHz. As an example, a FR1 reduced capability UE may have a maximum bandwidth of 20 MHz during and after initial access. An FR2 reduced capability UE may have a maximum bandwidth of 100 MHz during and after initial access. The operating bandwidth may correspond to a maximum UE bandwidth, and the reduced capability UE may have a lower maximum UE bandwidth than a higher capability UE. In some aspects, the reduced capability may not be configured with a non-initial BWP, whether downlink or uplink, that is wider than the maximum bandwidth of the reduced capability UE.

As another example, a reduced capability UE may have an uplink transmission power of at least 10 dB less than that a higher capability UE. As a further example, a reduced capability UE may have a reduced number of reception antennas in comparison to other UEs. For instance, a reduced capability UE may have only a single receive antenna and may experience a lower equivalent receive signal to noise ratio (SNR) in comparison to higher capability UEs that may have multiple antennas. Reduced capability UEs may also have reduced computational complexity than other UEs.

It may be helpful for communication to be scalable and deployable in a more efficient and cost-effective way. For example, it may be possible to relax or reduce peak throughput, latency, and/or reliability requirements for the reduced capability devices. In some examples, reductions in power consumption, complexity, production cost, and/or reductions in system overhead may be prioritized. As an example, industrial wireless sensors may have an acceptable latency up to approximately 100 ms. In some safety related applications, the latency of industrial wireless sensors may be acceptable up to 10 ms or up to 5 ms. The data rate may be lower and may include more uplink traffic than downlink traffic. As another example, video surveillance devices may have an acceptable latency up to approximately 500 ms.

Figure 4:
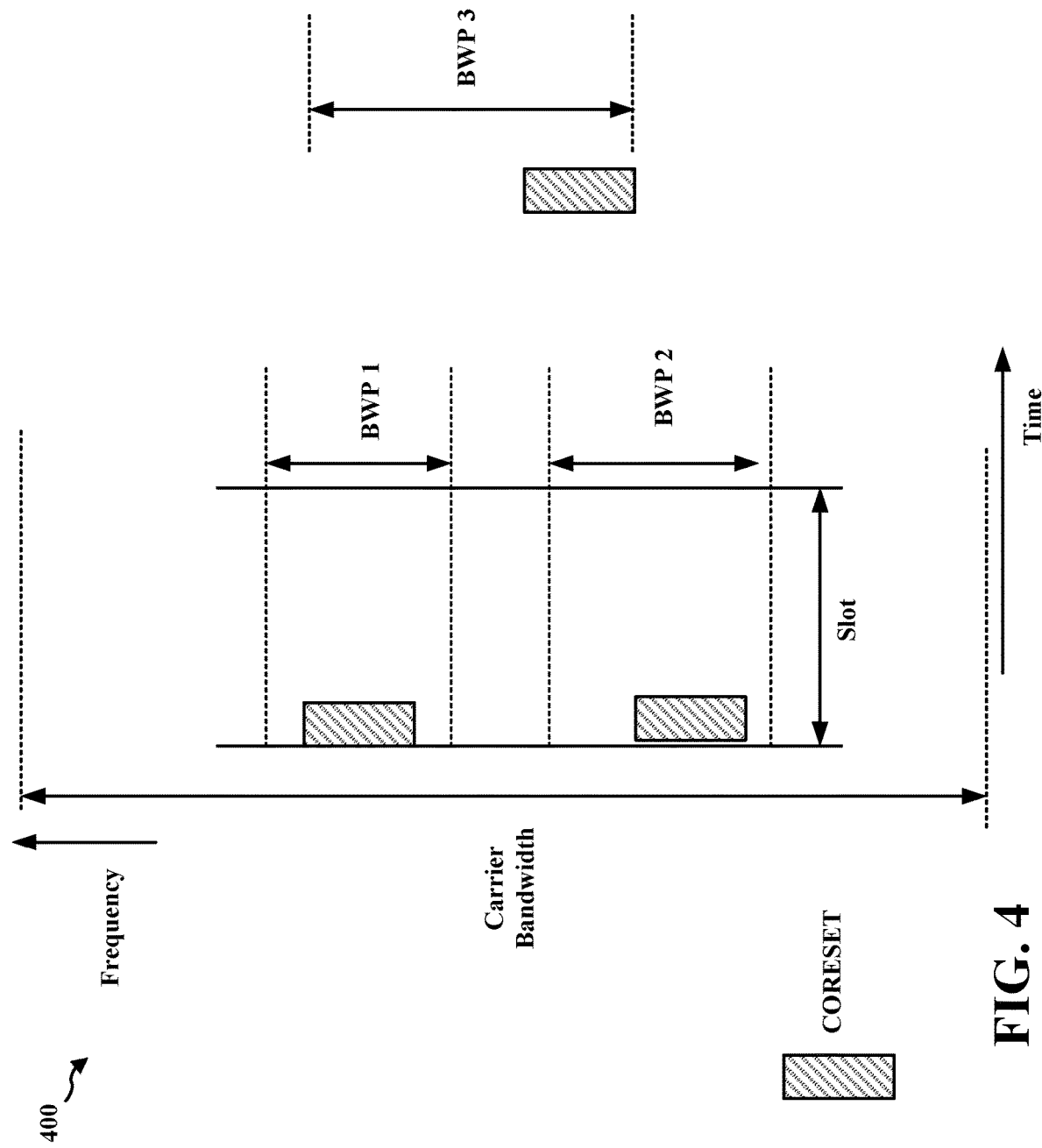
FIG. 4 is an example resource diagram showing example bandwidth parts (BWPs) within a carrier bandwidth in accordance with various aspects presented herein.

A carrier bandwidth may span a contiguous set of PRBs, e.g., from common resources blocks for a given numerology on a given carrier. A base station may configure one or more bandwidth parts (BWPs) that have a smaller bandwidth span than the carrier bandwidth. One or more of the BWPs may be configured for downlink communication, and may be referred to as a downlink (DL) BWP. FIG. 4 illustrates a resource diagram 400 showing multiple BWPs (e.g., BWP 1, BWP 2, and BWP 3) configured within a frequency span of the carrier bandwidth. One DL BWP may be active at a time, and the UE may not be expected to receive PDSCH, PDCCH, CSI-RS, or TRS outside of an active BWP without a measurement gap or BWP switching gap. Each DL BWP may include at least one control resource set (CORESET). In FIG. 4, the BWPs may be DL BWPs and are illustrated as having a CORESET within the BWP. In other examples, the BWP may be an UL BWP and may not include a CORESET configuration. One or more of the BWPs may be configured for uplink communication, and may be referred to as an uplink (UL) BWP. One UL BWP may be active at a time for the UE, and the UE may not transmit PUSCH or PUCCH outside of the active BWP. The use of a BWP may reduce the bandwidth monitored by the UE and/or used for transmissions, which may help the UE to save battery power.

A CORESET corresponds to a set of physical resources in time and frequency that a UE uses to monitor for PDCCH/DCI. Each CORESET comprises one or more resource blocks in the frequency domain and one or more symbols in the time domain. As an example, a CORESET might comprise multiple RBs in the frequency domain and 1, 2, or 3 contiguous symbols in the time domain. A Resource Element (RE) is a unit indicating one subcarrier in frequency over a single symbol in time. A Control Channel Element (CCE) includes Resource Element Groups (REGs), e.g., 6 REGs, in which an REG may correspond to one RB (e.g., 12 REs) during one OFDM symbol. REGs within a CORESET may be numbered in increasing order in a time-first manner, starting with 0 for the first OFDM symbol and the lowest-numbered resource block in the control resource set. A UE can be configured with multiple CORESETs, each CORESET being associated with a CCE-to-REG mapping. A search space may comprise a set of CCEs, e.g., at different aggregation levels. For example, the search space may indicate a number of candidates to be decoded, e.g., in which the UE performs decoding. A CORESET may comprise multiple search space sets.

FIG. 5A illustrates an example 500 in which a DL BWP 504 within a TDD carrier bandwidth 502 configured for a reduced capability UE is not aligned with an UL BWP 506 for the reduced capability UE. If the DL and UL BWPs are not aligned, e.g., at a center frequency, a guard period of time may be provided between downlink resources and uplink resources in order to enable the UE to switch between the BWPs. For example, the UE may change, at 508, between downlink reception in the DL BWP 504 to uplink transmission in the UL BWP 506. Similarly, the UE may change, at 510, between uplink transmission in the UL BWP 506 to downlink reception in the DL BWP 504.

FIG. 5B illustrates a time diagram 550 showing that between downlink reception 512 in the DL BWP (e.g., 504) and uplink transmission 514 in the UL BWP (e.g., 506), a guard period 518 or gap in time may be provided to allow the UE to switch between the BWPs. Similarly, a guard period 520 may be provided between uplink transmission 514 in the UL BWP (e.g., 506) and downlink reception 516 in the DL BWP (e.g., 504). In some aspects, the guard period may be between 50-200 μsec for the UE to retune between BWPs. Timeline changes, such as type B half-duplex frequency division duplex, may not be supported for the reduced capability UEs, in some aspects. The guard period, or time gap, at each switch between downlink communication (on the DL BWP) and uplink communication (on the UL BWP) may cause increased latency, reduced peak data rates for DL and/or UL, etc. in communication between the UE and the base station. The non-aligned BWPs for DL and UL communication may cause a loss of channel reciprocity, an increase UE complexity or power consumption, RF retuning, additional CSI measurements and reporting, additional collision handling procedures, additional restrictions on DL/UL switching positions, and/or co-existence challenges for multiplexing/scheduling of different UE types.

Figure 6:
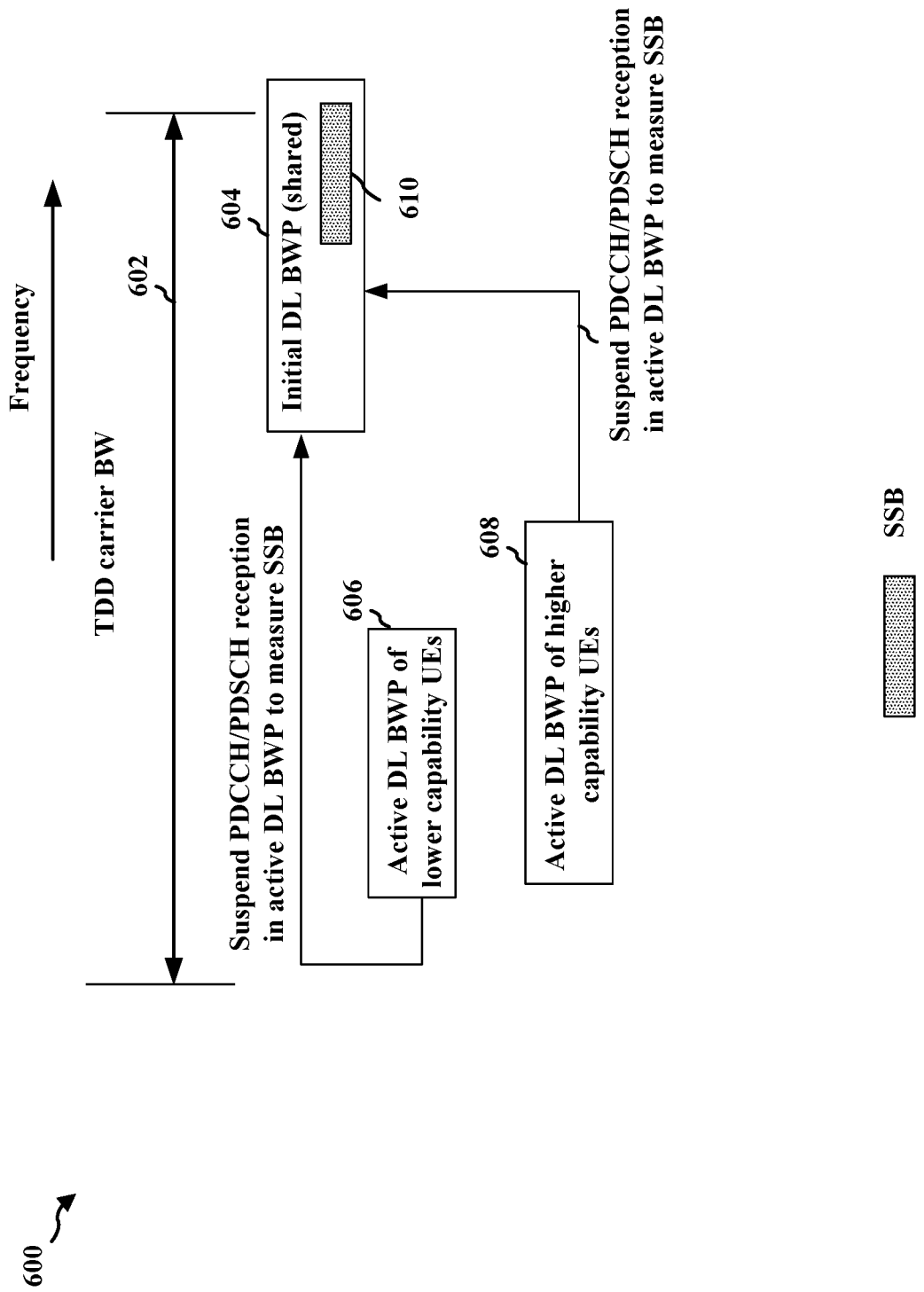
FIG. 6 illustrates an example aspects of BWPs for reduced capability UEs including a shared initial DL BWP in accordance with various aspects presented herein.

In some aspects, UEs having different levels of capabilities, such as reduced capability UEs and non-reduced (or higher) capability UEs, may share an initial DL BWP and CORESET 0 for initial access. The UEs may monitor the resources of CORESET 0 to receive system information that enable the UEs to perform initial access, for example. A cell-defining SSB (CS-SSB) may be transmitted within a maximum bandwidth supported by the reduced capability UEs. FIG. 6 illustrates an example 600 in which the initial DL BWP 604 within a carrier bandwidth 602 may be shared, e.g., configured for both, reduced capability UEs and higher capability UEs. The UEs may be configured with a different BWP as an active DL BWP, e.g., after performing initial access. For example, FIG. 6 illustrates that reduced capability UEs may be configured with the active DL BWP 606 for lower capability UEs, and the higher capability UEs may be configured with the active DL BWP 608 for higher capability UEs.

In some aspects, a reduced capability UE may be configured with a separate initial DL BWP, e.g., which may be different from CORESET 0, rather than the shared initial DL BWP illustrated in FIG. 6. In such examples, a non-cell-defining SSB (NCD-SSB) may be transmitted within the initial BWP that is configured for the reduced capability UE. The NCD-SSB may provide a quasi-co-location (QCL) source, or a reference signal, for the UE to determine the parameters to use in monitoring for and receiving one or more of a random access msg2 (e.g., a random access response (RAR), a random access msg4, or a paging message from a network entity such as a base station. The UE may use the NCD-SSB, received in the BWP configured for the reduced capability UEs, for L1 and L3 measurements (e.g., RSRP measurements, pathloss measurements, radio resource management (RRM) measurements, etc.).

A UE continues to measure an SSS or a TRS of the serving cell after an initial access for synchronization purposes, e.g., to maintain synchronization with the serving cell. To support cell level mobility, the UE may measure the SSB of the serving cell and one or more neighbor cells. If a reduced capability UE operates in an active DL BWP within an SSB, such as illustrated in FIG. 6, where the SSB resources are in the initial DL BWP 604 and not the active DL BWPs 606 and 608, the UE may be configured with an intra-frequency L3 measurement gap to enable the UE to switch from the active DL BWP without SSB 606 or 608 to the initial DL BWP 610 in order to measure the SSB(s), e.g., if an SSB is not transmitted in the active downlink BWP as shown in FIG. 6. The network may configure the periodic measurement gaps for the UE via RRC signaling, for example. When a measurement gap starts, the reduced capability UE may suspend reception of downlink control and/or data in the active DL BWP 606 and may switch to another BWP configured with the DL RS, e.g., such as the initial DL BWP. A periodic or semi-static TRS/CSI-RS/PRS may be transmitted within the active DL BWP 606, and may be used for time/frequency tracking, L1 measurements for link maintenance, or as a QCL source for paging, wake up signal (WUS) monitoring and reception, etc. In some aspects, RRM measurement relaxations may not be configured for a serving cell. A load imbalance may occur across the frequency of the carrier bandwidth 602 if the active BWP 606 or 608 does not include a periodic or semi-static SSB, TRS, PRS, or CSI-RS, e.g., due to the measurement gaps.

Aspects presented herein provide for BWPs, including initial and active BWPs that address the capabilities supported by reduced capability UEs as well as the capabilities supported by higher capability UEs. A joint optimization of the DL/UL BWP resource mapping for reduced capability UEs may provide for, or improve, co-existence of reduced capability UEs and higher capability UEs that exchange wireless communication with a base station in a same carrier bandwidth. In TDD operation, the DL and UL BWPs of the reduced capability UEs may or may not be aligned at a center frequency. For example, the center frequency of the DL BWP and the UL BWP may be aligned in some aspects. In other aspects, the center frequencies of the DL BWP and the UL BWP may not be aligned. The alignment of the BWPs at center frequency may enable TDD DL and UL communication without the time gap, or guard period, to allow for returning between the UL BWP and the DL BWP. The misalignment of the BWPs at center frequency may require TDD DL and UL communications to be configured with a time gap, or guard period, to allow for frequency returning between the UL BWP and the DL BWP. The uplink channels (e.g., PUCCH, PUSCH, PRACH, and/or SRS) of the reduced capability UEs may be mapped to the RBs at carrier edges, which may reduce resource fragmentation. As an example, a first hop of PUCCH may be at a first edge of the BWP and a second frequency hop may be at a second edge of the BWP. In some aspects, frequency hopping of the uplink channels or uplink signals may be disabled by the network, e.g., during and/or after initial access. The frequency hopping may be disabled, e.g., based on a DCI, MAC-CE, or system information (SI) from the network.

In some aspects, BWPs, such as DL BWPs and/or UL BWPs, may be configured separately for reduced capability UEs. The BWPs may be configured separately for reduced capability UEs in different connection states, so that there may be different BWP configurations for UEs in an RRC idle state, an RRC inactive state, and/or an RRC connected state.

Aspects presented herein provide for configurations and signaling support for reduced capability UEs that enables joint optimization of DL/UL BWP configurations, co-existence of different UE capabilities, power savings for reduced capability UEs, mitigation of resource fragmentation on DL/UL, and/or signaling overhead reduction.

Figure 7:
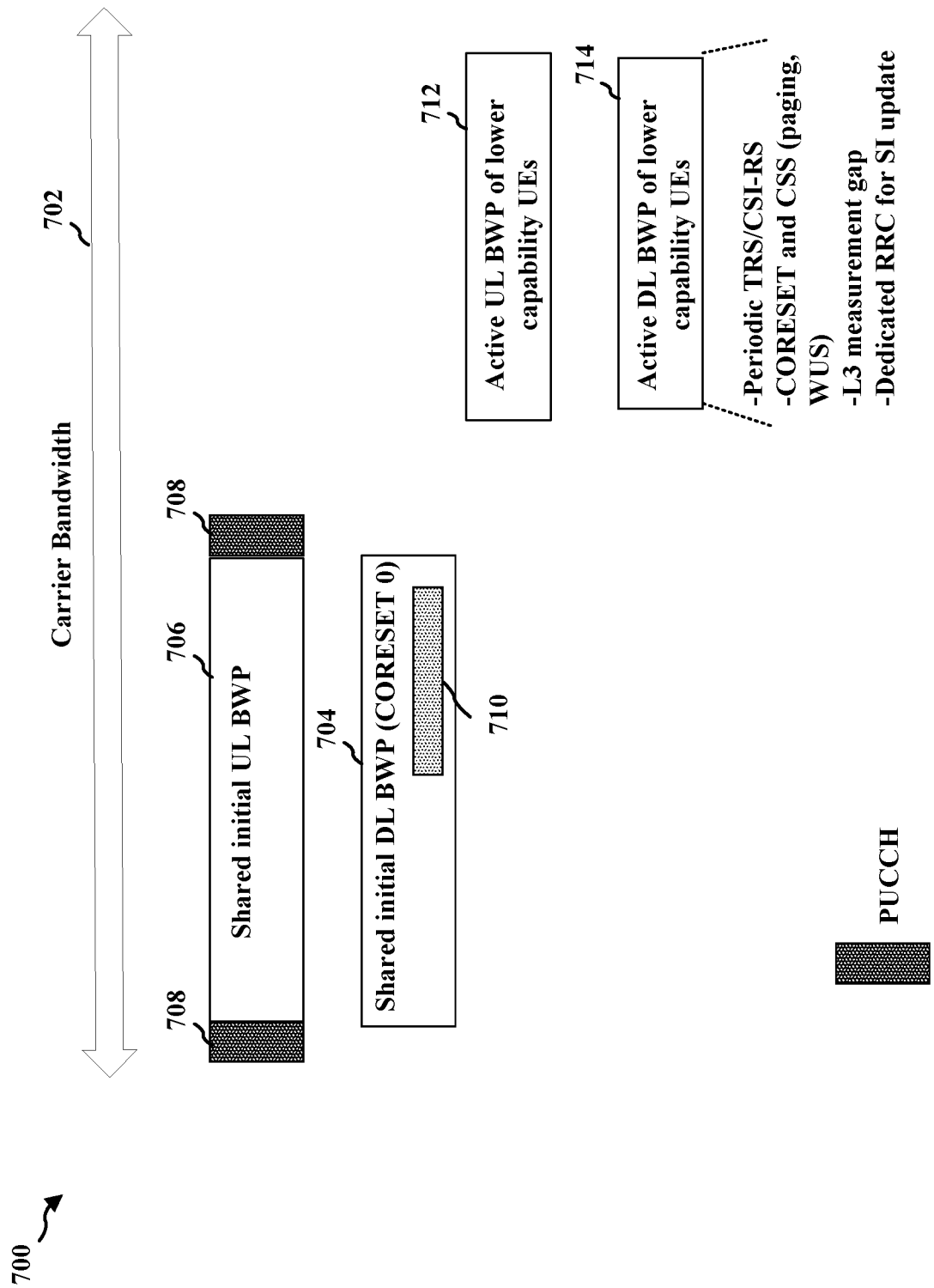
FIG. 7 illustrates an example aspects of BWPs for reduced capability UEs including a shared initial DL BWP in accordance with various aspects presented herein.

FIG. 7 illustrates an example 700 in which reduced capability UEs and non-reduced capability UEs may share an initial DL BWP 704 and an initial UL BWP 706 within a carrier bandwidth 702. During initial access, the different capability UEs (e.g., the reduced capability UEs and non-reduced capability UEs) may share a common CD-SSB 710, CORESET 0 (e.g., in an initial DL BWP 704), and initial UL BWP 706. Frequency hopping for PUCCH and/or PUSCH may be disabled for a reduced capability UE in the initial UL BWP. As illustrated at 708, the PUCCH resources for the reduced capability UEs may be provided at a frequency edge of the shared UL BWP 706.

After initial access, a reduced capability UE may operate in an active DL BWP 714 and an active UL BWP 712 for reduced capability UEs, e.g., and not for higher capability UEs. The active DL BWP 714 and the active UL BWP 712 may be referred to as being dedicated for the reduced capability UEs. The active DL BWP 714 for the reduced capability UEs may include a configuration for a periodic or semi-static TRS and/or periodic CSI-RS and/or PRS. The active DL BWP 714 for the reduced capability UEs may include a configuration for a common search space (CSS)

for the UE(s) to monitor for and receive a WUS, paging and system information update from the network, among other downlink signals. If an SSB is not transmitted in the active DL BWP 714, an L3 intra-frequency measurement gap may be provided to enable the UE to switch to measurement of the SSB in the initial DL BWP 704, as described in connection with FIG. 6. As illustrated in FIG. 7, the UE may receive an RRC message in the active DL BWP 714 that provides a system information (SI) update to the lower capability UE.

During and after initial access, the reduced capability UE may not expect to operate in a DL BWP or UL BWP wider than its maximum UE bandwidth associated with the reduced capability. The reduced capability UE may support different center frequencies for the DL BWP and UL BWP. For example, the UE may support the different center frequencies for the active DL BWP and the active UL BWP with a same BWP identifier (e.g., which may be referred to as a "BWP-id") in TDD operation.

Figure 8:
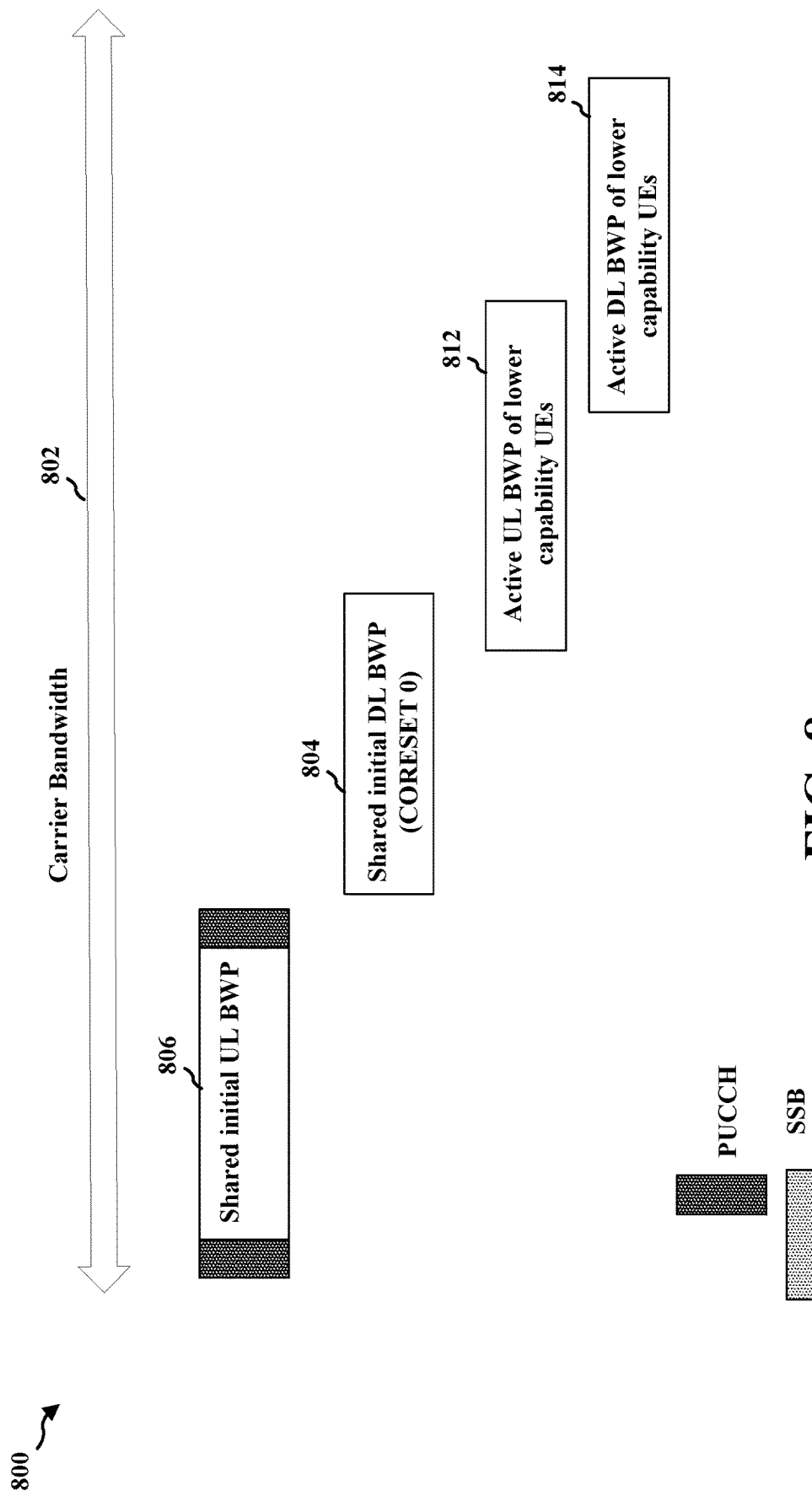
FIG. 8 illustrates an example aspects of BWPs for reduced capability UEs including a shared initial DL BWP in accordance with various aspects presented herein.

FIG. 8 illustrates an example 800 similar to FIG. 7 in which the active DL BWP 814 that is dedicated for reduced capability UEs may have a different center frequency than the active UL BWP 812 that is dedicated for the reduced capability UEs. Additionally, or alternatively, the shared initial DL BWP 804, which may be common to both reduced capability UEs and higher capability UEs for initial access, may have a different center frequency than the shared initial UL BWP 806 which is common to both reduced capability UEs and higher capability UEs for initial access.

Figure 9:
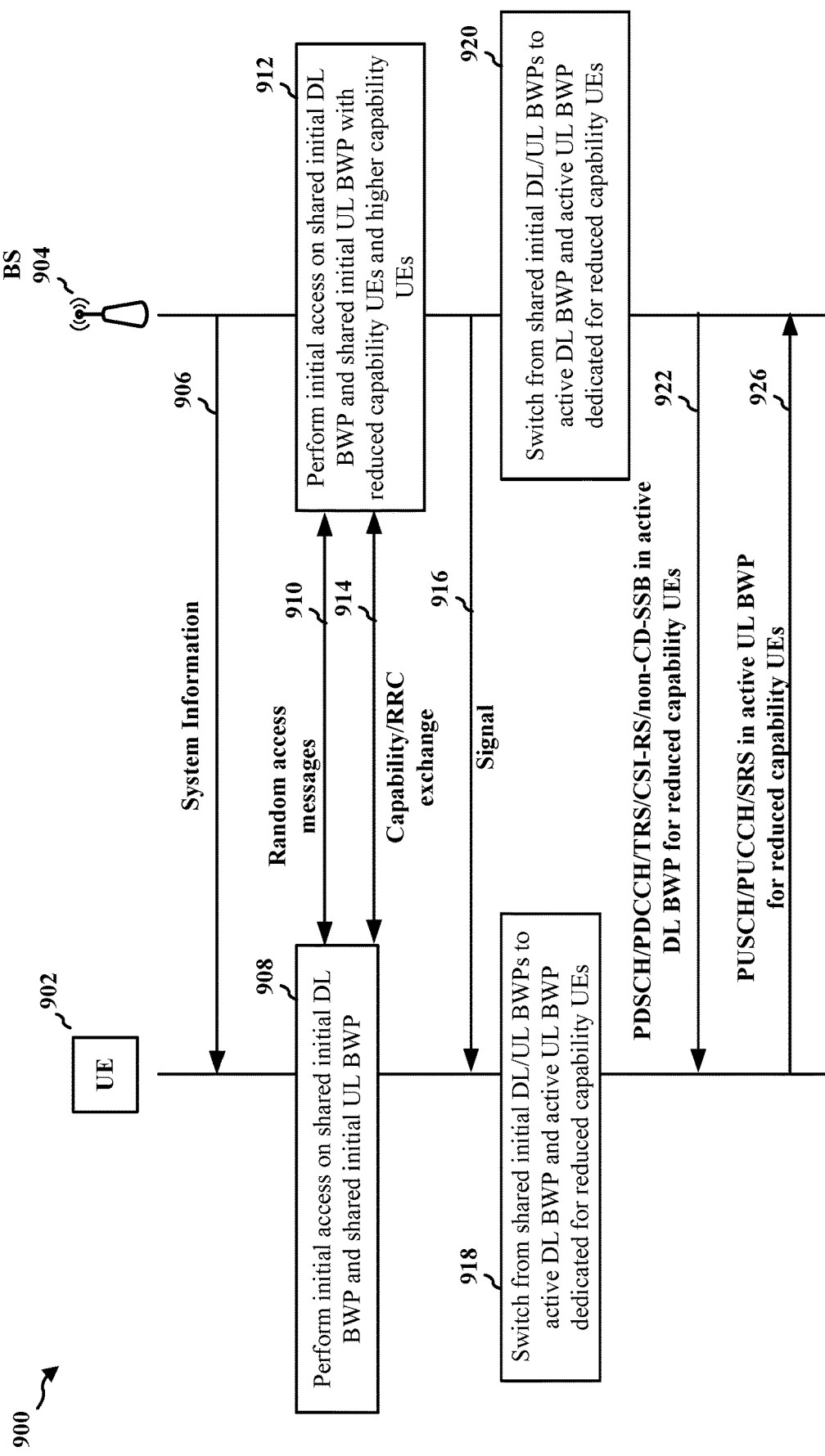
FIG. 9 is an example communication flow between a UE and a base station including the use of a shared initial DL BWP and dedicated active DL BWP for reduced capability UEs in accordance with various aspects presented herein.

FIG. 9 illustrates an example communication flow 900 between a reduced capability UE 902 and a base station 904 based on an initial DL BWP and UL BWP that are shared between reduced capability UEs and higher capability UEs, e.g., as described in connection with FIG. 7 and/or FIG. 8. The reduced capability of the UE 902 may include a reduced operating bandwidth, or a lower maximum UE bandwidth, that is less than for higher capability UEs. The UE 902 may operate based on TDD in which the UE monitors for downlink communication or transmits uplink communication and does not transmit and receive at overlapping times. At 906, the UE 902 may receive system information 906. The system information may be for wireless communication with the base station 904 in a carrier bandwidth, e.g., 802 in FIG. 8. The system information may indicate a BWP as a subset of the frequency resources of the carrier bandwidth for the UE for performing initial access. The system information may be dedicated to reduced capability UEs, e.g., including information applicable to reduced capability UEs and not applicable to higher capability UEs. The UE 902 may receive the system information 906 in a separate SIB for reduced capability UEs that is different than a SIB having system information applicable to higher capability UEs. The UE 902 may receive the system information 906 in a SIB that carries system information for both reduced capability UEs and higher capability UEs. The common SIB may have different information elements for higher capability UEs and reduced capability UEs. For example, the base station 904 may transmit the common, or shared, SIB in a CORESET 0 (e.g., in an initial DL BWP 704 or 804) that is shared by reduced capability UEs and higher capability UEs.

At 908, the UE 902 may perform an initial access procedure, such as a RACH procedure, in the initial DL BWP (e.g., shared initial DL BWP 704 or 804) and the initial UL BWP (e.g., shared initial UL BWP 706 or 806) that is common to reduced capability UEs and higher capability UEs. As a part of initial access, the UE 902 may transmit and receive random access messages 910 with the base station 904. As an example, the UE may transmit a random access Msg 1 with a preamble to the base station 904, may receive a Msg 2 from the base station, may transmit a Msg 3 to the base station and/or may receive a Msg 4 from the base station in the shared initial DL BWP and the shared initial UL BWP, e.g., as described in connection with FIG. 7 or 8. The UE 902 may transmit the random access messages at 910, such as a Msg 1, in a random access occasion based on an SSB-to-RO mapping for reduced capability UEs. The SSB-to-RO mapping may be based on a CD-SSB received in the shared initial DL BWP. The SSB-to-RO mapping and the SSB-to-preamble mapping may be based on a mapping pattern that is separately configured for the reduced capability UEs. The separate configuration may be received in the system information 906 in the shared initial DL BWP. Similar to the UE 902, the base station may perform the initial access procedure with the UE, at 912, based on the shared initial DL BWP and shared initial UL BWP that is common to both reduced capability UEs and higher capability UEs.

The UE may receive an indication, or configuration, of the active DL BWP and the active UL BWP that are dedicated for reduced capability UEs and not for higher capability UEs. The active DL BWP and the active UL BWP may correspond to 712 and 714 or to 812 and 814 in FIG. 7 or FIG. 8. The UE 902 may receive the configuration of the dedicated, active DL BWP and the dedicated, active UL BWP in system information for reduced capability UEs, e.g., at 906, in the shared initial DL BWP. The system information 906 may be broadcast for reception by any reduced capability UE. The UE 902 may receive the configuration of the dedicated, active DL BWP and the active UL BWP in RRC signaling, e.g., 914, from the base station 904. The RRC signaling may be directed to the UE 902 in unicast signaling from the base station 904. In some aspects, the UE 902 may determine or identify the configuration of the dedicated, active DL BWP and the active UL BWP based on a rule, based on a look up table, or based on previously known information without explicit signaling of the configuration from the base station 904. The use of a look up table or rule may reduce signaling overhead while enabling reduced capability UEs to communicate based on an active DL/UL BWP supported by the UE's bandwidth capabilities.

At 918, the UE 902 switches from transmitting and receiving (or monitoring) based on the shared initial DL BWP and shared initial UL BWP to transmitting and receiving (or monitoring) based on the active DL BWP and active UL BWP that are dedicated for reduced capability UEs. The base station 904 may perform a similar switch, at 920, for communication with the UE 902. For example, the UE may switch from BWPs 704 and 706 to BWPs 712 and 714 in FIG. 7. In FIG. 8, the UE may switch from BWPs 804 and 806 to BWPs 812 and 814. The UE 902 may perform the switch, at 918, after completing and exchange of capability signaling 914 in the shared initial DL BWP (e.g., 704 or 804). The UE 902 may indicate the UE's reduced bandwidth capability to the base station 904 in the capability signaling exchange, at 914, which may inform the base station 904 that the UE will switch to the monitoring/transmitting in the active DL BWP or active UL BWP for reduced capability UEs. The switch, at 918, may be triggered by a signal 916 from the base station 904. The signal 916 may include a MAC-CE that is broadcast, multicast, or unicast. The signal 916 may include an RRC reconfiguration from the base station 904. The RRC reconfiguration may be unicast to the UE 902. The signal 916 may include a DCI that is multicast or broadcast to reduced capability UEs. In some aspects, the UE may switch, at 918, without a signal 916 from the base station. In such examples, the UE may perform the switch, at 918, based on a timer. The UE 902 may receive the timer configuration in the system information 906, e.g., in system information dedicated for reduced capability UEs. The timer may indicate for the UE to perform the switch after a configured number of subframes, a configured number of slots, or a configured amount of time following a reference point in time, such as following a capability exchange message, a RACH message, or another signal transmitted by the UE or received from the base station.

The active DL BWP that is dedicated for the reduced capability UEs, e.g., 714 or 814, may have an associated configuration for a CSS and one or more RS within the bandwidth of the active DL BWP. For example, the active DL BWP may include a configured CORESET and CSS for the UE to monitor to receive paging from the network, a WUS from a base station, a system information update, or group common power control for PUCCH/PUSCH/SRS. The active DL BWP may include a configured periodic TRS and/or periodic CSI-RS and/or positioning RS (PRS). The active DL BWP may include a configured non-CD SSB. The active DL BWP may include a configured CORESET and CSS for system information updates of reduced capability UEs. The active DL BWP may include a configured resynchronization reference signal indicating a system information update for reduced capability UEs.

As illustrated at 922, the UE 902 may monitor for and/or receive PDSCH, PDCCH, a TRS, a CSI-RS, a PRS, or a non-CD SSB in the active DL BWP that is dedicated for the reduced capability UEs. At 926, the UE 902 may transmit PUSCH, PUCCH, and/or SRS in the active UL BWP for the reduced capability UEs.

Figure 10:
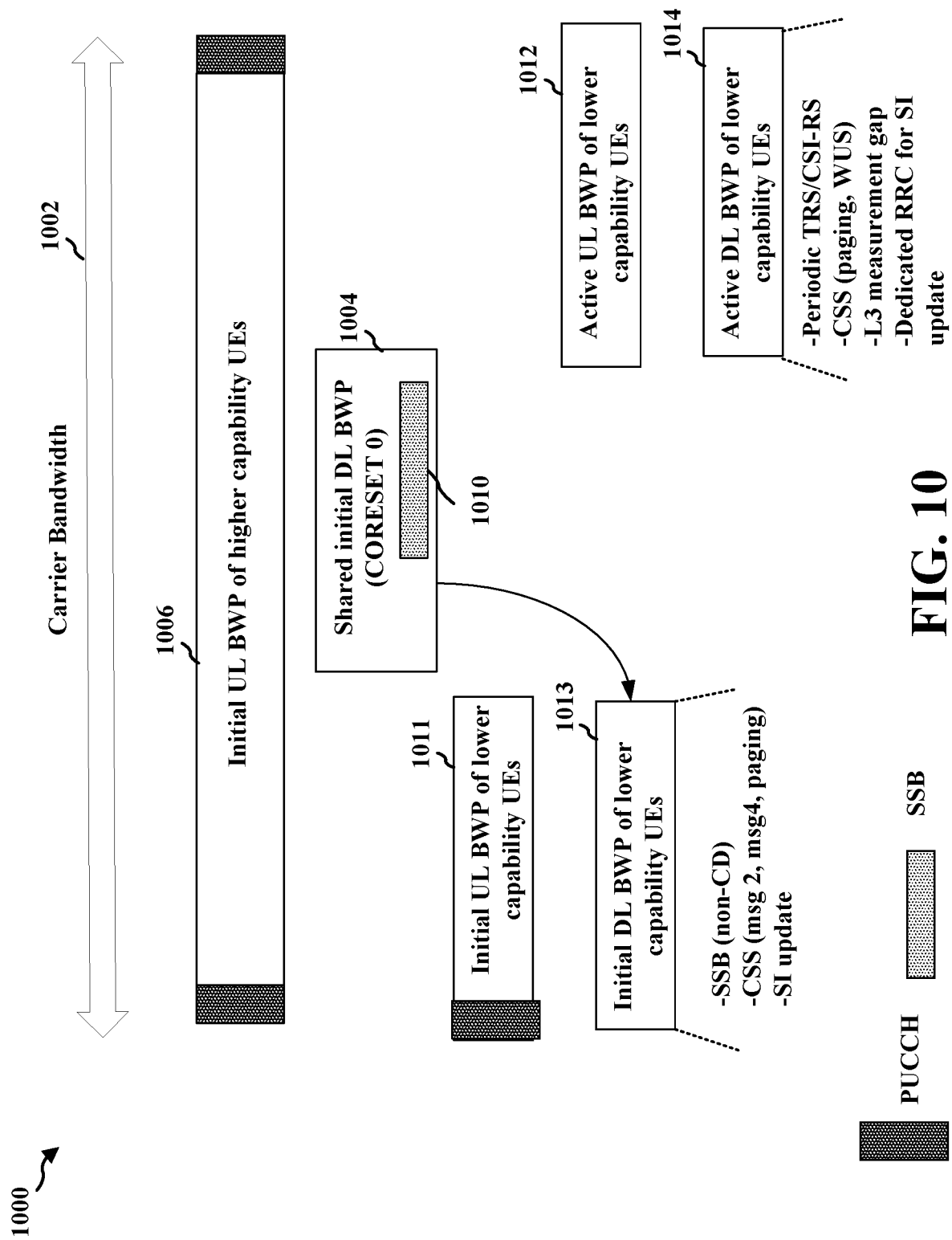
FIG. 10 illustrates an example aspects of BWPs for reduced capability UEs including a shared initial DL BWP and a dedicated initial DL BWP in accordance with various aspects presented herein.

FIG. 10 illustrates an example 1000 in which reduced capability UEs and non-reduced capability UEs may share, within a carrier bandwidth 1002, an initial DL BWP 1004 with higher capability UEs but not the initial UL BWP 1006, which is instead configured for higher capability UEs and not for reduced capability UEs. This enables more flexibility in the configuration of the initial UL BWP 1006, which may have a bandwidth that is larger than the bandwidth capability supported by the reduced capability UEs. The reduced capability UE may perform initial access using an initial UL BWP 1011 that is dedicated for reduced capability UEs. After initial access, the reduced capability UE may switch to the active UL BWP 1012 and the active DL BWP 1014 that are both dedicated for reduced capability UEs. The reduced capability UE may use the shared initial DL BWP 1004 for at least a portion of initial access, and may change to a different initial DL BWP 1013 that is specific to reduced capability UEs to complete initial access.

During initial access, the different capability UEs (e.g., the reduced capability UEs and non-reduced capability UEs) may share a common CD-SSB 1010, CORESET0 (e.g., initial DL BWP 1004). In contrast to FIGS. 7 and 8, the reduced capability UE may switch to a pair of separately configured initial DL BWP 1013 and initial UL BWP 1011 that are configured for reduced capability UEs to finish an initial access procedure. In some aspects, the initial DL BWP 1013 and initial UL BWP 1011 may be at a carrier's frequency edge. The UE may exchange random access message, e.g., including any of a random access msg1 (e.g., including a RACH preamble), msg2 (e.g., RAR), msg3, or msg4 in the corresponding initial DL BWP 1013 or initial UL BWP 1011. Frequency hopping for PUCCH and/or PUSCH may be disabled for a reduced capability UE in the initial UL BWP 1011.

After initial access, a reduced capability UE may operate in an active DL BWP 1014 and an active UL BWP 1012 for reduced capability UEs and not for higher capability UEs. Similar to the active DL BWP 714 in FIG. 7, the BWP 1014 for the reduced capability UEs may include a configuration for a periodic or semi-static TRS and/or periodic CSI-RS. The active DL BWP 1014 for the reduced capability UEs may include a configuration for a CSS for monitoring for and receiving a WUS, paging, or system information update from the network, among other downlink signals. If an SSB is not transmitted in the active DL BWP 1014, an L3 intra-frequency measurement gap to enable the UE to switch to measurement of the SSB (e.g., 1010) in the initial DL BWP 1004, as described in connection with FIG. 6, if an SSB is not transmitted in the active downlink BWP as shown in FIG. 10. As illustrated in FIG. 10, the UE may receive an RRC message in the active DL BWP 1014 that provides an SI update to the lower capability UE.

During and after initial access, the reduced capability UE may not expect to operate in a DL BWP or UL BWP wider than its maximum UE bandwidth associated with the reduced capability. The reduced capability UE may support different center frequencies for the DL BWP and UL BWP. For example, the UE may support the different center frequencies for the active DL BWP and the active UL BWP with a same BWP identifier (e.g., which may be referred to as a "BWP-id") in TDD operation, e.g., as illustrated in the example in FIG. 8.

The shared initial DL BWP 1004 may carry some information that enables the reduced capability UE to begin access with the network and that provides the information about the dedicated initial BWP resources for the reduced capability UEs. The dedicated initial DL BWP, e.g., for reduced capability UEs and not higher capability UEs, may carry system information that is dedicated for the reduced capability UEs, and which may be different than the system information in the DL BWP 1004 for the higher capability UEs.

Figure 11:
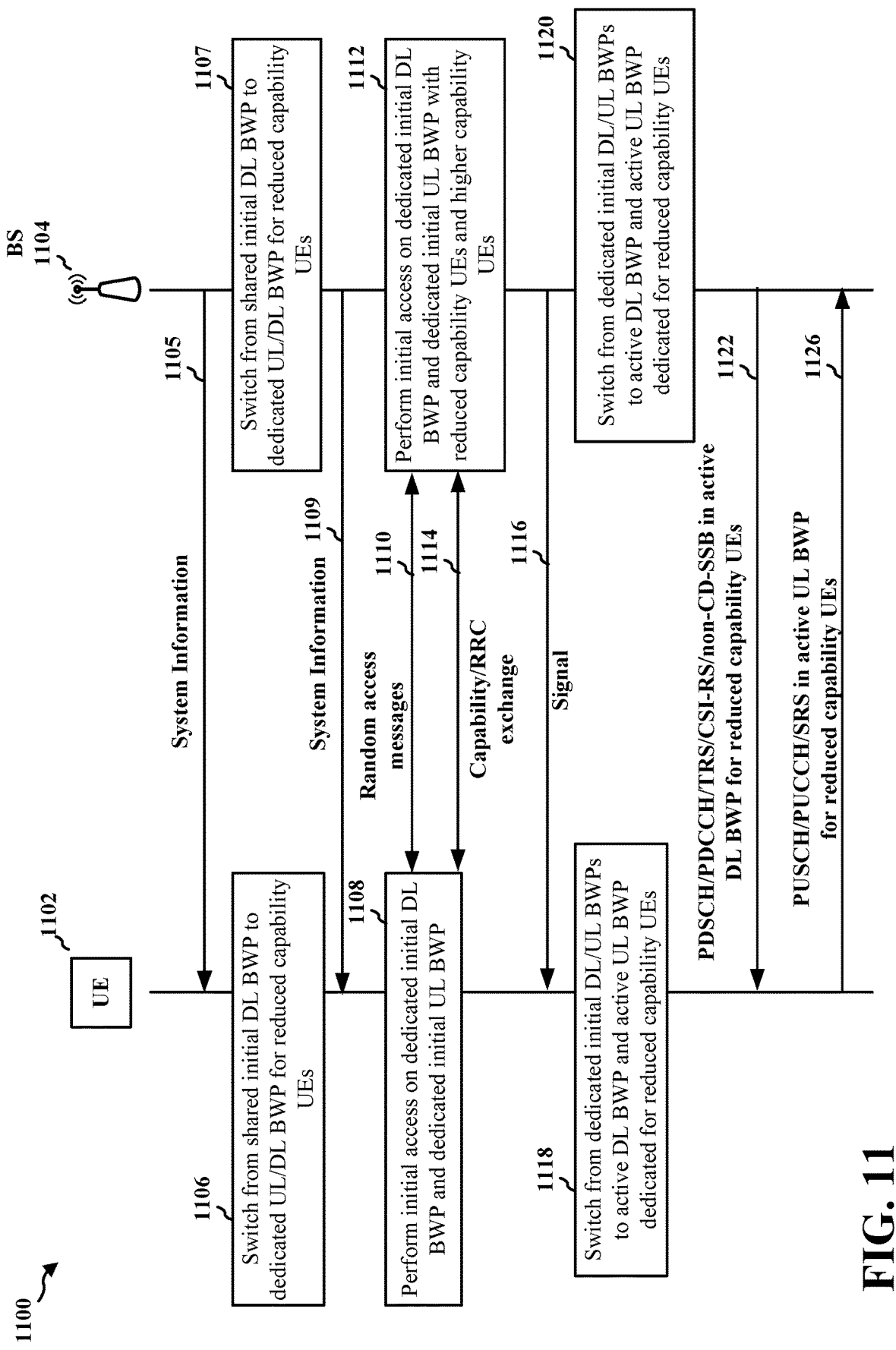
FIG. 11 is an example communication flow between a UE and a base station including the use of a shared initial DL BWP and dedicated initial DL BWP for reduced capability UEs in accordance with various aspects presented herein.

FIG. 11 illustrates an example communication flow 1100 between a reduced capability UE 1102 and a base station 1104 based on a first initial DL BWP that is shared between reduced capability UEs and higher capability UEs, and a second initial DL BWP that is dedicated for reduced capability UEs, e.g., as described in connection with FIG. 10. The reduced capability of the UE 1102 may include a reduced operating bandwidth, or a lower maximum UE bandwidth, that is less than for higher capability UEs. The UE 1102 may operate based on TDD in which the UE monitors for downlink communication or transmits uplink communication and does not transmit and receive at overlapping times. Both the initial BWPs and the active BWPs for the reduced capability UEs may be configured separately by the network.

The UE 1102 may receive system information 1105, e.g., in the shared initial DL BWP. The system information 1105 may be for wireless communication with the base station 1104 in a carrier bandwidth, e.g., 1002 in FIG. 10. The system information 1105 may indicate a BWP as a subset of the frequency resources of the carrier bandwidth for the UE for performing initial access. The system information 1105 may be dedicated to reduced capability UEs, e.g., including information applicable to reduced capability UEs and not applicable to higher capability UEs. The UE 1102 may receive the system information 1105 in a separate SIB for reduced capability UEs that is different than a SIB having system information applicable to higher capability UEs. The UE 1102 may receive the system information 1105 in a SIB that carries system information for both reduced capability UEs and higher capability UEs. The common SIB may have different information elements for higher capability UEs and reduced capability UEs. For example, the base station 1104 may transmit the common, or shared, SIB in a CORESET 0 (e.g., in an initial DL BWP 1004) that is shared by reduced capability UEs and higher capability UEs.

The UE may receive a configuration of an initial DL BWP (e.g., 1013) and an initial UL BWP (e.g., 1011) that are configured for (e.g., dedicated for/specific to) reduced capability UEs. The UE 1102 may receive the configuration of the initial DL/UL BWPs for reduced capability UEs in the system information 1105 for the reduced capability UEs, e.g., in the shared initial DL BWP (e.g., 1004). In some aspects, the UE 1102 may determine the initial DL BWP (e.g., 1013) and an initial UL BWP (e.g., 1011) for the reduced capability UEs based on a look up table, a rule, or information known to the UE 1102 without explicit signaling from the base station 1104.

The UE 1102 may switch to the dedicated initial DL BWP and initial UL BWP (e.g., 1013 and 1011), at 1106. The UE 1102 may switch to perform at least a part of the initial access procedure 1108. Therefore, the base station 1104, may perform a similar switch, at 1107, in order to perform initial access and/or a capability exchange at 1112.

At 1108, the UE 1102 may perform at least a part an initial access procedure, such as a RACH procedure, in the dedicated initial DL BWP (e.g., initial DL BWP 1013) and the dedicated initial UL BWP (e.g., initial UL BWP 1011) that is dedicated for reduced capability UEs. As a part of initial access, the UE 1102 may transmit and receive random access messages 1110 with the base station 1104. As an example, the UE may transmit a random access Msg 1 with a preamble to the base station 904, may receive a Msg 2 from the base station, may transmit a Msg 3 to the base station and/or may receive a Msg 4 from the base station in the dedicated initial DL BWP (e.g., 1013) and the dedicated initial UL BWP (e.g., 1011), e.g., as described in connection with FIG. 10. In some aspects, dedicated physical random access channel (PRACH) resources may configured for the reduced capability UEs, which may enable the network to identify a reduced capability of the UE during initial access and to schedule Msg 3/PUCCH within an UL BWP supported by the UE. The UE 1102 may transmit the random access messages at 1110, such as a Msg 1, in a random access occasion (RO) based on an SSB-to-RO mapping for reduced capability UEs. The base station 1104 may configure the SSB-to-RO mapping pattern separately, e.g., in separate system information or other signaling, for reduced capability UEs and higher capability UEs. In some aspects, a non-CD-SSB in the dedicated initial DL BWP 1013 for the reduced capability UEs may be the reference SSB for the SSB-to-RO mapping and/or the SSB-to-preamble mapping. One of more of the parameters of the non-CD SSB may be the same as for the CD-SSB, such as a periodicity, block indexes, power offsets, center frequency, numerology, etc. The shared parameters may be configured in connection with the CD-SSB or may be configured separately from the CD-SSB. The configuration for the non-CD SSB may be selected to help ensure the measurement accuracy of a reduced capability UE having reduced reception branches and/or reduced antenna efficiency. If the parameters (e.g., periodicity, block indexes, power offsets, center frequency, numerology, etc.) of the non-CD SSB are configured separately from, or different than, the CD-SSB, the parameters may be indicated to the reduced capability UEs in various ways. As a first example, the parameters of the non-CD SSB that is the basis of the SSB-to-RO or SSB-to-preamble mapping may be configured in system information 1105 (e.g., in a separate SIB than for the higher capability UEs or in a same SIB but different IE than for the higher capability UEs). The parameters of the non-CD SSB may be configured in a broadcast PDCCH. The UE 1102 may determine one or more of the parameters of the non-CD SSB based on a rule, or a look-up table or based on information known to the UE. The parameters of the non-CD SSB may be indicated to the UE, or determined by the UE, based on any combination of system information, PDCCH, a look up table, or a rule.

If the non-CD SSB is configured in the dedicated initial DL BWP (e.g., 1013) or the dedicated active DL BWP (e.g., 1014), the UE 1102, as well as higher capability UEs, may use the SSB for L1 and/or L3 measurements. The reduced capability UE 1102, as well as higher capability UEs, may use the SSB to perform time/frequency tracking and/or other link maintenance procedures in an RRC connected state. The reduced capability UE, as well as higher capability UEs, may use the non-CD SSB to perform timing advance (TA), resource mapping and beam management in small data transmissions (SDT).

Figure 12:
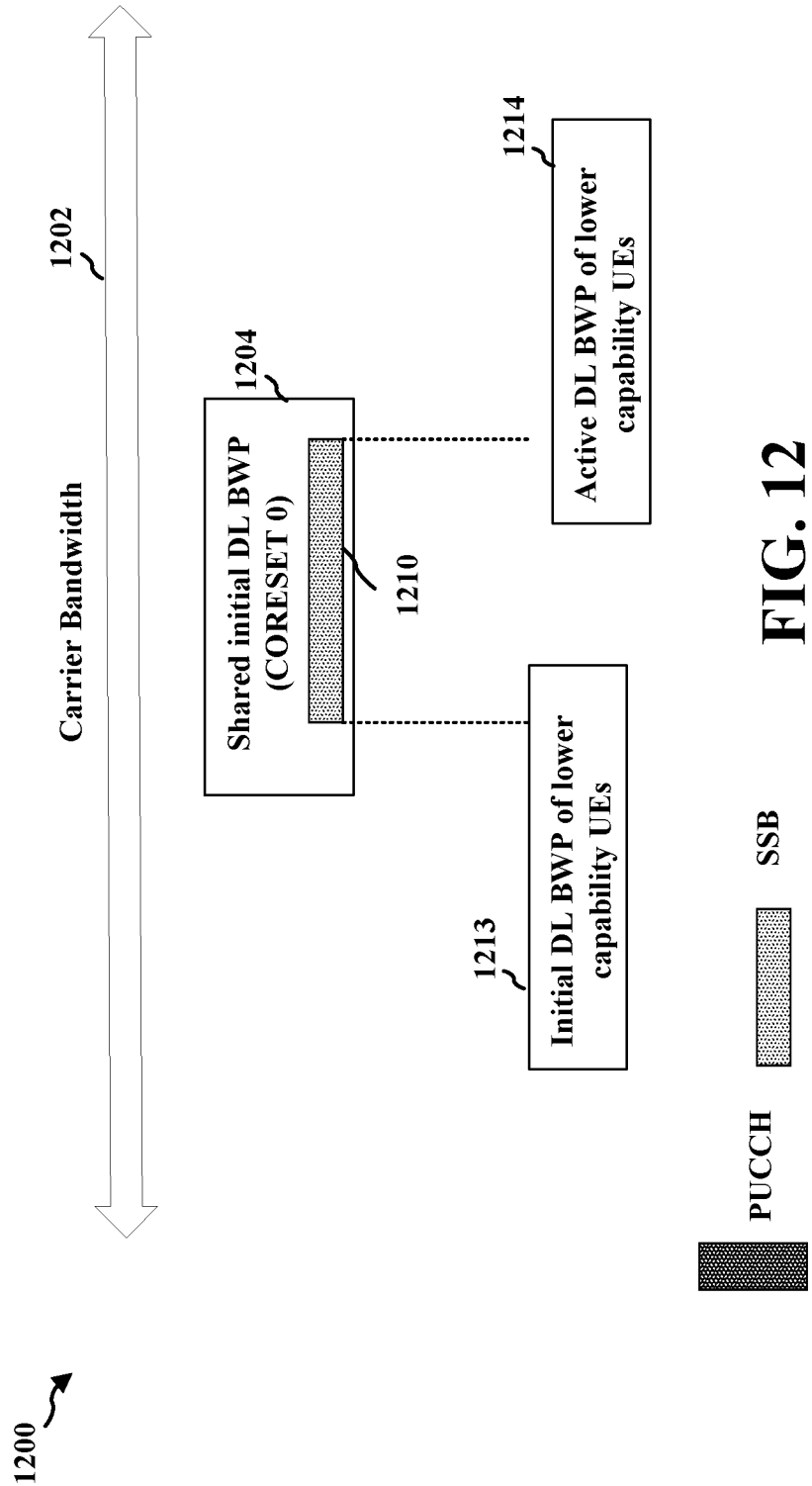
FIG. 12 illustrates an example aspects of BWPs for reduced capability UEs including a shared initial DL BWP and a dedicated initial DL BWP in accordance with various aspects presented herein.

The dedicated initial DL BWP (e.g., 1013) and the dedicated active DL BWP (e.g., 1014) may overlap, at least partially, in a frequency domain with the CD-SSB (e.g., 1010) or CORESET 0 of the shared initial DL BWP 1004. FIG. 12 illustrates an example 1200 in which the dedicated active DL BWP 1214 and the dedicated initial DL BWP 1213 overlap partially in a frequency domain with the CD-SSB 1210 of the shared CORESET 0/shared initial DL BWP 1204 for the carrier bandwidth 1202.

The UE 1102 may receive an indication, or configuration, of the active DL BWP (e.g., 1014) and the active UL BWP (e.g., 1012) that are dedicated for reduced capability UEs and not for higher capability UEs. The UE 1102 may receive the configuration of the dedicated, active DL BWP and the active UL BWP in system information 1109 for reduced capability UEs in the dedicated initial DL BWP (e.g., 1013). The system information 1109 may be broadcast for reception by any reduced capability UE. The UE 1102 may receive the configuration of the dedicated, active DL BWP and the active UL BWP in RRC signaling from the base station 1104. The RRC signaling may be directed to the UE 1102 in unicast signaling from the base station 1104. In some aspects, the UE 1102 may determine or identify the configuration of the dedicated, active DL BWP 1014 and the active UL BWP 1012 based on a rule, based on a look up table, or based on previously known information without explicit signaling of the configuration from the base station 1104. The use of a look up table or rule may reduce signaling overhead while enabling reduced capability UEs to communicate based on an active DL/UL BWP supported by the UE's bandwidth capabilities.

At 1118, the UE 1102 switches from transmitting and receiving (or monitoring) based on the dedicated initial DL BWP 1013 and dedicated initial UL BWP 1011 to transmitting and receiving (or monitoring) based on the active DL BWP 1014 and active UL BWP 1014 that are dedicated for reduced capability UEs. The base station 1104 may perform a corresponding switch, at 1120, for communication with the UE 1102. The UE 1102 may perform the switch, at 1118, after completing an exchange of capability signaling 1114 in the dedicated initial DL BWP (e.g., 1013). The switch, at 1118, may be triggered by a signal 1116 from the base station 1104. The signal 1116 may include a MAC-CE that is broadcast multicast, or unicast. The signal 1116 may include an RRC reconfiguration from the base station 1104. The RRC reconfiguration may be unicast to the UE 1102. The signal 1116 may include a DCI that is multicast or broadcast to reduced capability UEs. In some aspects, the UE may switch, at 1118, without a signal 1116 from the base station. In such examples, the UE 1102 may perform the switch, at 1118, based on a timer. The UE 1102 may receive the timer configuration in the system information 1106, e.g., in system information dedicated for reduced capability UEs. The timer may indicate for the UE to perform the switch after a configured number of subframes, a configured number of slots, or a configured amount of time following a reference point in time, such as following a capability exchange message, a RACH message, or another signal transmitted by the UE or received from the base station.

The active DL BWP that is dedicated for the reduced capability UEs, e.g., 1014, may have an associated configuration for a CSS and one or more RS within the bandwidth of the active DL BWP. For example, the active DL BWP may include a configured CORESET and CSS for the UE to monitor to receive paging from the network, a system information update, a WUS from the base station 1104, or group common power control for PUCCH/PUSCH/SRS. The active DL BWP may include a configured periodic or semi-static TRS and/or periodic CSI-RS and/or PRS. The active DL BWP may include a configured non-CD SSB. The active DL BWP may include a configured CORESET and CSS for system information updates of reduced capability UEs. The active DL BWP may include a configured resynchronization reference signal indicating a system information update for reduced capability UEs.

As illustrated at 1122, the UE 1102 may monitor for and/or receive PDSCH, PDCCH, a TRS, a CSI-RS, a PRS, or a non-CD SSB in the active DL BWP that is dedicated for the reduced capability UEs. At 1126, the UE 1102 may transmit PUSCH, PUCCH, and/or SRS in the active UL BWP for the reduced capability UEs.

Figure 13:
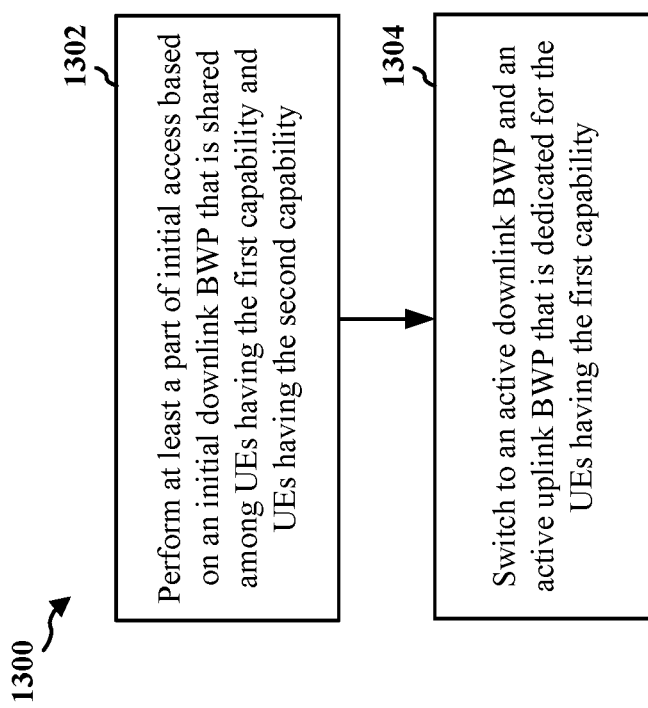
FIG. 13 is a flowchart of a method of wireless communication at a UE in accordance with various aspects presented herein.

FIG. 13 is a flowchart 1300 of a method of wireless communication. The method may be performed by a UE (e.g., the UE 104, 350, 902, 1102; the apparatus 1504). The method may provide a configuration of BWPs for and after initial access that provides reduced bandwidths supported by the reduced capability UEs while maintaining flexibility in configuring bandwidth for higher capability UEs. The UE performing the method may have a first capability associated with a lower maximum UE bandwidth than a second capability. For example, the UE may be a reduced capability UE.

At 1302, the UE performs at least a part of initial access based on an initial downlink BWP that is shared among UEs having the first capability and UEs having the second capability. UEs "having the first capability" or "UEs of the first capability" may refer to UEs that support the first capability. UEs "having the second capability" or "UEs of the second capability" may refer to UEs that support the second capability. The initial access may be performed, e.g., by the BWP component 198 and/or the initial BWP component 1540 of the apparatus 1504 in FIG. 15. FIG. 9 illustrates an example of a UE 902 performing initial access in a shared initial DL BWP. FIG. 11 illustrates an example of a UE 1102 that performs part of an initial access in a shared initial DL BWP and part of the initial access in a dedicated DL BWP for reduced capability UEs.

The UE may perform the initial access based partially on a first initial downlink BWP shared among the UEs having the first capability and the UEs having the second capability and partially based on a second initial downlink BWP that is dedicated for the UEs having the first capability. BWP switching of the reduced capability UEs may be configured for a TDD mode, a full-duplex frequency division duplex (FD-FDD) mode, or a half-duplex frequency division duplex (HD-FDD) mode.

The UE may perform the initial access based on an initial uplink BWP dedicated for the UEs having the first capability. Performing the initial access may include transmitting a random access preamble during a RO having an SSB-to-RO mapping (e.g., which may be referred to as a spatial reference for a random access procedure) for the UEs having the first capability that is different than for the UEs having the second capability. The mapping of the RO to the SSB provides a spatial reference for the RO. The SSB-to-RO mapping for the UEs having the first capability is based on a non-CD SSB. One or more parameter for the non-CD SSB may be configured independently from a CD-SSB, the one or more parameters including at least one of: a periodicity, a block index, a spatial reference for a random access procedure, a power offset, a center frequency, or a numerology. One or more parameter for the non-CD SSB may be the same parameter as for a CD-SSB, the one or more parameters including at least one of: a periodicity, a block index, a spatial reference for a random access procedure, a power offset, a center frequency, or a numerology. The one or more parameters may be from at least one of system information, a broadcast physical downlink control channel, a look up table, or a rule. The non-CD SSB may be configured in at least one of the second initial downlink BWP or the active downlink BWP and is common to measurement by the UEs having the first capability and the UEs having the second capability. At least one of the second initial downlink BWP or the active downlink BWP may overlap in frequency with the CD-SSB or a CORESET 0 of the first initial downlink BWP. The initial downlink BWP may include a CORESET 0 or a CD-SSB that is configured for the UEs having the first capability and the UEs having the second capability, and wherein the first initial downlink BWP and the initial uplink BWP have a same or different center frequencies and a same or different bandwidth, the bandwidth of the initial DL BWP and the bandwidth of the initial UL BWP being no more than the lower maximum UE bandwidth of the UEs having the first capability and the second capability. The initial uplink BWP and the second initial downlink BWP may be at an edge of the carrier bandwidth.

At 1304, the UE switches to an active downlink BWP and an active uplink BWP that are dedicated for the UEs having the first capability. The switching may be performed, e.g., by the BWP component 198 and/or the active BWP component 1542 of the apparatus 1504 in FIG. 15. FIGS. 9 and 11 illustrate examples of UEs 902 and 1102 switching to a dedicated active DL BWP for reduced capability UEs. In some aspects, the UE may perform the initial access, at 1302, based on the initial downlink BWP and an initial uplink BWP that is shared among the UEs having the first capability and the UEs having the second capability, and the UE may switch to the active downlink BWP and the active uplink BWP that are dedicated for the UEs having the first capability after performing the initial access. FIG. 9 illustrates example aspects of the UE using a shared initial DL BWP and shared initial UL BWP. The initial downlink BWP may include a CORESET 0 or a CD-SSB that is configured for the UEs having the first capability and the UEs having the second capability, where the initial downlink BWP and the initial uplink BWP have a bandwidth at a center frequency of a carrier bandwidth, the bandwidth being no more than the lower maximum UE bandwidth of the UEs having the first capability.

In some aspects, the UE may further receive system information or a system information update in the initial downlink BWP, the system information comprised in a SIB dedicated for the UEs of the first capability. In some aspects, the UE may further receive system information or a system information update in the initial downlink BWP, the system information including separate information dedicated for the UEs of the first capability in a SIB carrying information for the UEs of the first capability and the UEs of the second capability.

Performing the initial access may include transmitting a random access preamble during a RO having an SSB-to-RO mapping based on a CD-SSB. Performing the initial access may include transmitting a random access preamble during a RO having an SSB-to-RO mapping or an SSB-to-preamble mapping that is configured for the UEs having the first capability.

In some aspects, the UE may further receive a configuration for the active downlink BWP and the active uplink BWP. The configuration for the active downlink BWP may include one or more of: a periodic or semi-static TRS, a periodic or semi-static CSI-RS, a periodic or semi-static PRS, a CSS or CORESET for paging, WUS, system information update, or group common power control, a non-CD SSB, an additional CORESET or an additional CSS for system information update, a re-synchronization reference signal for UE synchronization in a DRX mode or for indicating the system information update and assisting with UE synchronization in discontinuous reception, or an L3 intra-frequency measurement gap. The configuration may be received in system information dedicated for the UEs having the first capability. The configuration may be received in RRC signaling for the UE. The configuration of the active downlink BWP or the active uplink BWP may be based on a rule or look up table.

In some aspects, the UE may further perform a capability signaling procedure indicating that the UE has the first capability, wherein the UE switches to the active downlink BWP and the active uplink BWP after completing the capability signaling procedure and based on at least one of: a MAC-CE, an RRC reconfiguration, DCI or a timer configured in system information for the UEs having the first capability.

In some aspects, the UE may receive a first configuration of the second initial downlink BWP that is dedicated for the UEs having the first capability and may receive a second configuration of the active downlink BWP. In some aspects, the first configuration of the second initial downlink BWP may be received, within the first initial downlink BWP, in a SIB that is dedicated for the UEs of the first capability. In some aspects, the first configuration of the second initial downlink BWP may be received, within the first initial downlink BWP, as information dedicated for the UEs of the first capability in a SIB carrying information for the UEs of the first capability and the UEs of the second capability. In some aspects, the first configuration of the second initial downlink BWP may be received in system information, within a CORESET 0, the system information being dedicated for the UEs of the first capability. In some aspects, the second configuration of the active downlink BWP may be received in the second initial downlink BWP. In some aspects, a configuration of the second initial downlink BWP may be based on a look up table or a rule.

Figure 14:
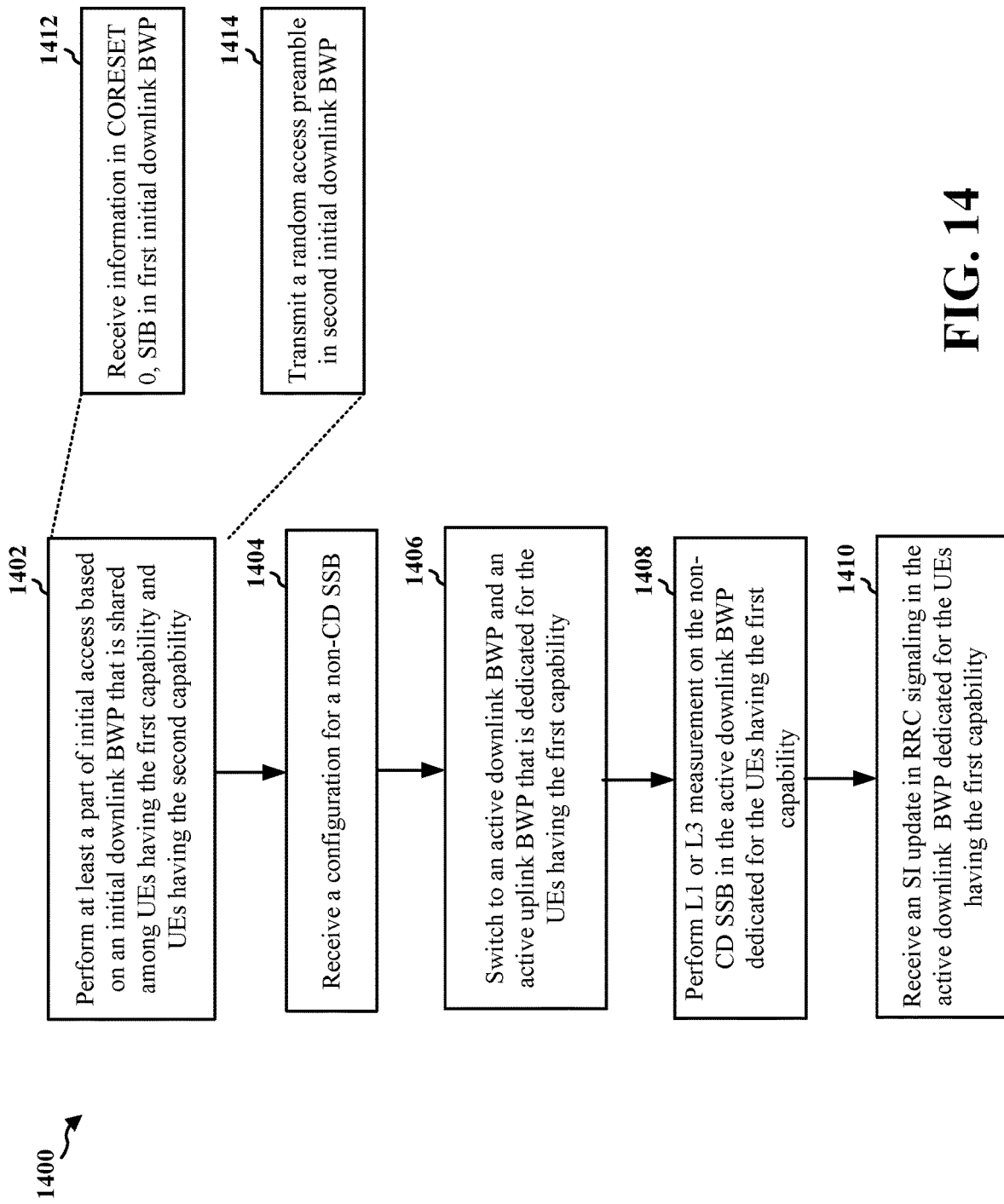
FIG. 14 is a flowchart of a method of wireless communication at a UE in accordance with various aspects presented herein.

FIG. 14 is a flowchart 1400 of a method of wireless communication. The method may be performed by a UE (e.g., the UE 104, 350, 902, 1102; the apparatus 1504). The method may provide a configuration of BWPs for and after initial access that provides reduced bandwidths supported by the reduced capability UEs while maintaining flexibility in configuring bandwidth for higher capability UEs. The UE performing the method may have a first capability associated with a lower maximum UE bandwidth than a second capability. For example, the UE may be a reduced capability UE.

At 1402, the UE may perform at least a part of initial access based on an initial downlink BWP that is shared among UEs having the first capability and UEs having the second capability. The initial access may be performed, e.g., by the BWP component 198 of the apparatus 1504 in FIG. 15. FIG. 11 illustrates an example of a UE 1102 that performs part of an initial access in a shared initial DL BWP and part of the initial access in a dedicated DL BWP for reduced capability UEs. FIG. 9 illustrates an example of a UE 902 performing initial access in a shared initial DL BWP. The UE may perform the initial access based partially on a first initial downlink BWP shared among the UEs having the first capability and the UEs having the second capability and partially based on a second initial downlink BWP that is dedicated for the UEs having the first capability.

For example, the UE may perform the initial access based on an initial uplink BWP dedicated for the UEs having the first capability. As an example, the UE may perform the initial access based partially on a first initial downlink BWP shared among the UEs having the first capability and the UEs having the second capability and partially based on a second initial downlink BWP that is dedicated for the UEs having the first capability. The initial downlink BWP may include a CORESET 0 and CD-SSB that is configured for the UEs having the first capability and the UEs having the second capability. As illustrated at 1412, the UE may receive a first configuration of the second initial downlink BWP that is dedicated for the UEs having the first capability, where the first configuration of the second initial downlink BWP is received within the first initial downlink BWP, in a SIB carrying information for the UEs of the first capability and the UEs of the second capability. The second initial downlink BWP that is dedicated for the UEs having the first capability may not include the CORESET 0 or the CD-SSB. As illustrated at 1414, the UE may transmit a random access preamble during a random access occasion (RO) in the second initial downlink BWP, the RO having a synchronization signal block (SSB)-to-RO mapping to the CD-SSB in the first initial downlink BWP.

As illustrated at 1404, the UE may receive a configuration for a non-cell-defining SSB (non-CD SSB) in the active downlink BWP dedicated for the UEs having the first capability.

At 1406, the UE may switch to an active downlink BWP and an active uplink BWP that are dedicated for the UEs having the first capability. BWP switching of the reduced capability UEs may be configured for a TDD mode, an FD-FDD mode, or an HD-FDD mode. The switching may be performed, e.g., by the BWP component 198 of the apparatus 1504 in FIG. 15. FIGS. 9 and 11 illustrate examples of UEs 902 and 1102 switching to a dedicated active DL BWP for reduced capability UEs. In some aspects, the UE may perform the initial access, at 1302, based on the initial downlink BWP and an initial uplink BWP that is shared among the UEs having the first capability and the UEs having the second capability, and the UE may switch to the active downlink BWP and the active uplink BWP that are dedicated for the UEs having the first capability after performing the initial access. FIG. 9 illustrates example aspects of the UE using a shared initial DL BWP and shared initial UL BWP. The initial downlink BWP may include a CORESET 0 or a CD-SSB that is configured for the UEs having the first capability and the UEs having the second capability, where the initial downlink BWP and the initial uplink BWP have a bandwidth at a center frequency of a carrier bandwidth, the bandwidth being no more than the lower maximum UE bandwidth of the UEs having the first capability.

At 1408, the UE may perform at least one of a layer 1 (L1) or a layer 3 (L3) measurement on the non-CD SSB in the active downlink BWP dedicated for the UEs having the first capability. The reception and the measurement may be performed, e.g., by the BWP component 198, e.g., of the UE 104, 350, or the apparatus 1504.

As illustrated at 1410, the UE may receive a system information update in RRC signaling in the active downlink BWP dedicated for the UEs having the first capability. The reception may be performed, e.g., by the BWP component 198, e.g., of the UE 104, 350, or the apparatus 1504. FIG. 10 shows an example of an active downlink BWP 1014 for UEs having a reduced bandwidth capability, the dedicated, active downlink BWP including RRC signaling for system information (SI) updates.

In some aspects, the UE may receive a first configuration of the second initial downlink BWP that is dedicated for the UEs having the first capability. The UE may also receive, in the second initial downlink BWP, a second configuration of the active downlink BWP. The reception may be performed, e.g., by the BWP component 198, e.g., of the UE 104, 350, or the apparatus 1504.

Performing the initial access may include transmitting a random access preamble during a RO having an SSB-to-RO mapping for the UEs having the first capability that is different than for the UEs having the second capability. The SSB-to-RO mapping for the UEs having the first capability is based on a non-CD SSB. One or more parameter for the non-CD SSB may be configured independently from a CD-SSB, the one or more parameter including at least one of: a periodicity, a block index, a spatial reference for a random access procedure, a power offset, a center frequency, or a numerology. One or more parameter for the non-CD SSB may be the same parameter as for a CD-SSB, the one or more parameter including at least one of: a periodicity, a block index, a spatial reference for a random access procedure, a power offset, a center frequency, or a numerology. The one or more parameter may be from at least one of system information, a broadcast physical downlink control channel, a look up table, or a rule. The non-CD SSB may be configured in at least one of the second initial downlink BWP or the active downlink BWP and is common to measurement by the UEs of the first capability and the UEs of the second capability. At least one of the second initial downlink BWP or the active downlink BWP may overlap in frequency with the CD-SSB or a CORESET 0 of the first initial downlink BWP. The initial downlink BWP may include a CORESET 0 or a CD-SSB that is configured for the UEs having the first capability and the UEs having the second capability, and wherein the first initial downlink BWP and the initial uplink BWP have a same or different center frequencies and a same or different bandwidth, the bandwidth of the initial DL BWP and the bandwidth of the initial UL BWP being no more than the lower maximum UE bandwidth of the UEs having the first capability. The initial uplink BWP and the second initial downlink BWP may be at an edge of the carrier bandwidth.

In some aspects, the UE may further receive system information or a system information update in the initial downlink BWP, the system information comprised in a SIB dedicated for the UEs of the first capability. In some aspects, the UE may further receive system information or a system information update in the initial downlink BWP, the system information including separate information dedicated for the UEs of the first capability in a SIB carrying information for the UEs of the first capability and the UEs of the second capability.

Performing the initial access may include transmitting a random access preamble during a RO having an SSB-to-RO mapping based on a CD-SSB. Performing the initial access may include transmitting a random access preamble during a RO having an SSB-to-RO mapping or an SSB-to-preamble mapping that is configured for the UEs having the first capability.

In some aspects, the UE may further receive a configuration for the active downlink BWP and the active uplink BWP. The configuration for the active downlink BWP may include one or more of: a periodic or semi-static TRS, a periodic or semi-static CSI-RS, a periodic or semi-static PRS, a CSS or CORESET for paging, WUS, system information update, or group common power control, a non-CD SSB, an additional CORESET or an additional CSS for system information update, a re-synchronization reference signal for UE synchronization in a DRX mode or for indicating the system information update and assisting with UE synchronization in discontinuous reception, or an L3 intra-frequency measurement gap if an SSB is not transmitted in the active downlink BWP. The configuration may be received in system information dedicated for the UEs having the first capability. The configuration may be received in RRC signaling for the UE. The configuration of the active downlink BWP or the active uplink BWP may be based on a rule or look up table.

In some aspects, the UE may further perform a capability signaling procedure indicating that the UE has the first capability, wherein the UE switches to the active downlink BWP and the active uplink BWP after completing the capability signaling procedure and based on at least one of: a MAC-CE, an RRC reconfiguration, DCI) or a timer configured in system information for the UEs having the first capability.

In some aspects, the UE may receive a first configuration of the second initial downlink BWP that is dedicated for the UEs having the first capability and may receive a second configuration of the active downlink BWP. In some aspects, the first configuration of the second initial downlink BWP may be received, within the first initial downlink BWP, in a SIB that is dedicated for the UEs of the first capability. In some aspects, the first configuration of the second initial downlink BWP may be received, within the first initial downlink BWP, as information dedicated for the UEs of the first capability in a SIB carrying information for the UEs of the first capability and the UEs of the second capability. In some aspects, the first configuration of the second initial downlink BWP may be received in system information, within a CORESET 0, the system information being dedicated for the UEs of the first capability. In some aspects, the second configuration of the active downlink BWP may be received in the second initial downlink BWP. In some aspects, a configuration of the second initial downlink BWP may be based on a look up table or a rule.

Figure 15:
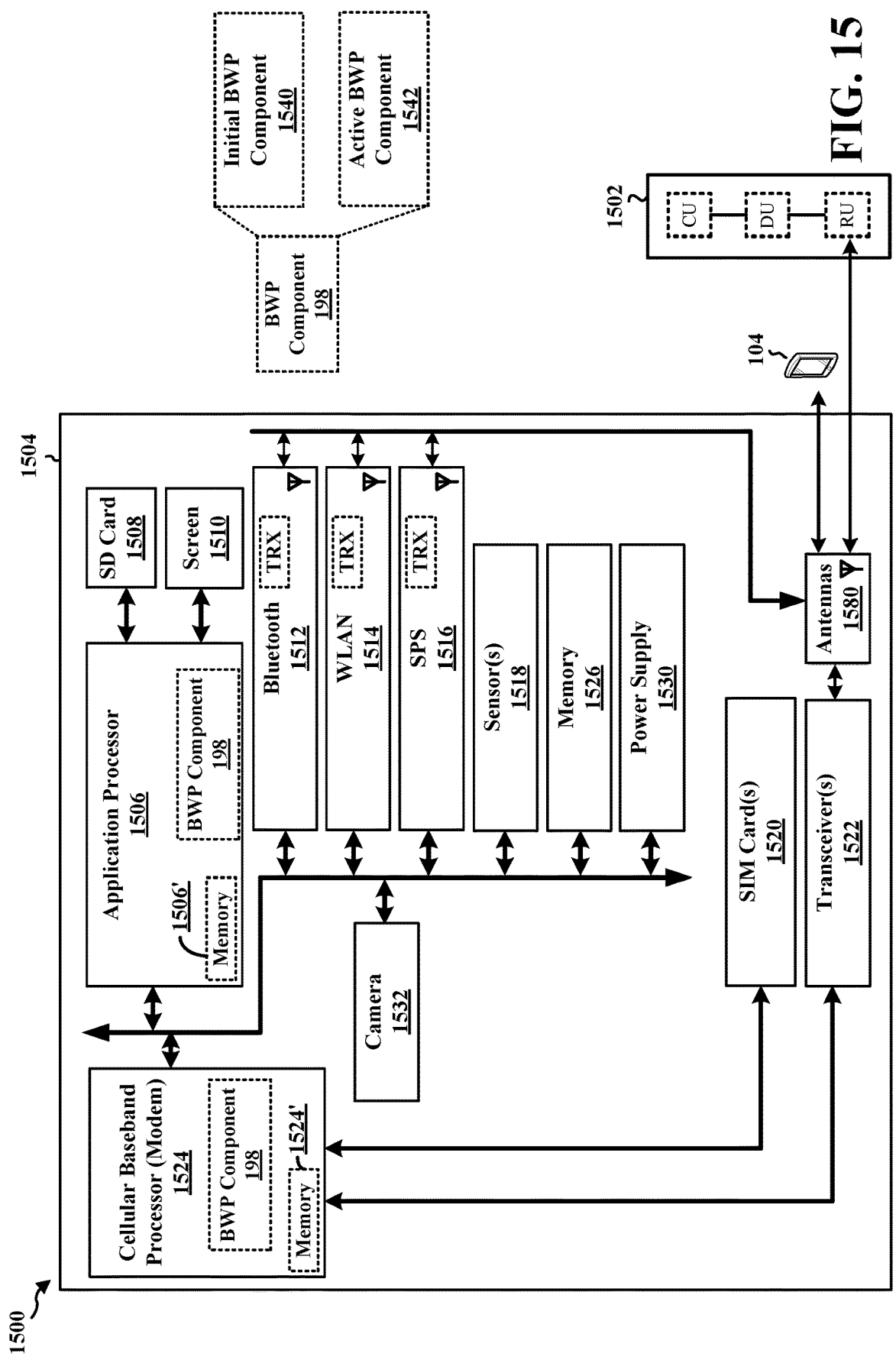
FIG. 15 is a diagram illustrating an example of a hardware implementation for an example apparatus in accordance with various aspects presented herein.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

The cellular baseband processor 1524 and/or the application processor 1506 may include a BWP component 198 that is configured to perform at least a part of initial access based on an initial downlink BWP that is shared among UEs having the first capability and UEs having the second capability, e.g., as described in connection with 1302 in FIG. 13, and to switch to an active downlink BWP and an active uplink BWP that are dedicated for the UEs having the first capability, e.g., as described in connection with 1304 in FIG. 13. As an example, the BWP component 198 may include an initial BWP component 1540 that is configured to perform at least a part of initial access based on an initial downlink BWP that is shared among UEs having the first capability and UEs having the second capability, e.g., as described in connection with 1302 in FIG. 13. The BWP component 198 may be further configured to perform any of the aspects of the algorithm in the flowchart of FIG. 13, FIG. 14, and/or the aspects performed by the UEs in FIGS. 9 and/or 11.

The apparatus 1504 may include additional components that perform each of the blocks of the algorithm in the flowchart of FIG. 13, 14, and/or the aspects performed by the UEs in FIGS. 9 and/or 11. As such, each block in the flowchart of FIG. 13 and/or the aspects performed by the UEs in FIGS. 9 and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1504 may include a variety of components configured for various functions. In one configuration, the apparatus 1504, and in particular the cellular baseband processor 1524 and/or the application processor 1506 may include means for performing at least a part of initial access based on an initial downlink BWP that is shared among UEs having the first capability and UEs having the second capability and means for switching to an active downlink BWP and an active uplink BWP that are dedicated for the UEs having the first capability. The apparatus 1504 may further include means for receiving system information in the initial downlink BWP, the system information comprised in a SIB dedicated for the UEs of the first capability. The apparatus 1504 may further include means for receiving system information in the initial downlink BWP, the system information including separate information dedicated for the UEs of the first capability in a SIB carrying information for the UEs of the first capability and the UEs of the second capability. The apparatus 1504 may further include means for receiving a configuration for the active downlink BWP and the active uplink BWP. The apparatus 1504 may further include means for performing a capability signaling procedure indicating that the UE has the first capability. The apparatus 1504 may further include means for receiving a first configuration of the second initial downlink BWP that is dedicated for the UEs having the first capability and for receiving a second configuration of the active downlink BWP. apparatus 1504 may include means for receiving a first configuration of the second initial downlink BWP that is dedicated for the UEs having the first capability, wherein the first configuration of the second initial downlink BWP is received within the first initial downlink BWP, in a SIB carrying information for the UEs of the first capability and the UEs of the second capability. The apparatus 1504 may include means for receiving a configuration for a non-CD SSB in the active downlink BWP dedicated for the UEs having the first capability, and means for performing at least one of a L1 or a L3 measurement on the non-CD SSB in the active downlink BWP dedicated for the UEs having the first capability. The apparatus 1504 may include means that perform each of the blocks of the algorithm in the flowchart of FIG. 13, 14, and/or the aspects performed by the UEs in FIGS. 9 and/or 11 The means may be one or more of the components of the apparatus 1504 configured to perform the functions recited by the means. As described supra, the apparatus 1504 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
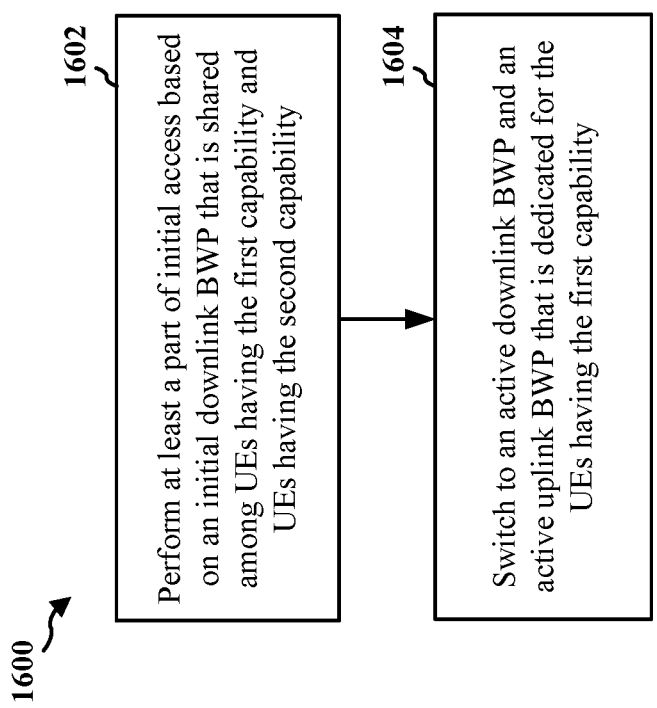
FIG. 16 is a flowchart of a method of wireless communication at a network entity in accordance with various aspects presented herein.

FIG. 16 is a flowchart 1600 of a method of wireless communication. The method may be performed by a network entity, such as a base station or a component of a base station (e.g., the base station 102/180, 310, 904, 1104; the network entity 1802). The method may provide a configuration of BWPs for and after initial access that provides reduced bandwidths supported by the reduced capability UEs while maintaining flexibility in configuring bandwidth for higher capability UEs. The network entity performing the method may support communication with one or more UEs having a first capability associated with a lower maximum UE bandwidth than a second capability and one or more UEs of the second capability. For example, the base station may communicate with reduced capability UEs and higher capability UEs.

At 1602, the network entity performs an initial access having a first capability associated with a lower maximum UE bandwidth than a second capability, at least a part of the initial access being based on an initial downlink BWP that is shared among UEs having the first capability and UEs having the second capability. The initial access may be performed, e.g., by the BWP component 199 of the network entity 1802 in FIG. 18. FIG. 9 illustrates an example of a base station 904 performing initial access in a shared initial DL BWP. FIG. 11 illustrates an example of a base station 1104 that performs part of an initial access in a shared initial DL BWP and part of the initial access in a dedicated DL BWP for reduced capability UEs.

The network entity may perform the initial access based partially on a first initial downlink BWP shared among the UEs having the first capability and the UEs having the second capability and partially based on a second initial downlink BWP that is dedicated for the UEs having the first capability. The network entity may perform the initial access based on an initial uplink BWP dedicated for the UEs having the first capability. The network entity may configure BWP switching of the reduced capability UEs for a TDD mode, a FD-FDD mode, or an HD-FDD mode.

Performing the initial access may include receiving a random access preamble during a RO having an SSB-to-RO mapping for the UEs having the first capability that is different than for the UEs having the second capability. The SSB-to-RO mapping for the UEs having the first capability is based on a non-CD SSB. One or more parameter for the non-CD SSB may be configured independently from a CD-SSB, the one or more parameters including at least one of: a periodicity, a block index, a spatial reference for a random access procedure, a power offset, a center frequency, or a numerology. One or more parameter for the non-CD SSB may be the same parameter as for a CD-SSB, the one or more parameters including at least one of: a periodicity, a block index, a spatial reference for a random access procedure, a power offset, a center frequency, or a numerology. The one or more parameters may be from at least one of system information, a broadcast physical downlink control channel, a look up table, or a rule. The non-CD SSB may be configured in at least one of the second initial downlink BWP or the active downlink BWP and is common to measurement by the UEs of the first capability and the UEs of the second capability. At least one of the second initial downlink BWP or the active downlink BWP may overlap in frequency with the CD-SSB or a CORESET 0 of the first initial downlink BWP. The initial downlink BWP may include a CORESET 0 and CD-SSB that is configured for the UEs having the first capability and the UEs having the second capability, and wherein the first initial downlink BWP and the initial uplink BWP have a same or different center frequencies and a same or different bandwidth, the bandwidth of the initial DL BWP and the bandwidth of the initial UL BWP being no more than the lower maximum UE bandwidth of the UEs having the first capability and the second capability. The initial uplink BWP and the second initial downlink BWP may be at an edge of the carrier bandwidth.

At 1604, the network entity switches, for communication with the UE, to an active downlink BWP and an active uplink BWP that are dedicated for the UEs having the first capability. The switching may be performed, e.g., by the BWP component 199 of the network entity 1802 in FIG. 18. FIGS. 9 and 11 illustrate examples of base stations 904 and 1104 switching to a dedicated active DL BWP for reduced capability UEs. In some aspects, the network entity may perform the initial access, at 1602, based on the initial downlink BWP and an initial uplink BWP that is shared among the UEs having the first capability and the UEs having the second capability, and the base station may switch to the active downlink BWP and the active uplink BWP that are dedicated for the UEs having the first capability after performing the initial access. FIG. 9 illustrates example aspects of the base station 904 using a shared initial DL BWP and shared initial UL BWP. The initial downlink BWP may include a CORESET 0 and CD-SSB that is configured for the UEs having the first capability and the UEs having the second capability, where the initial downlink BWP and the initial uplink BWP have a bandwidth at a center frequency of a carrier bandwidth, the bandwidth being no more than the lower maximum UE bandwidth of the UEs having the first capability.

In some aspects, the network entity may further transmit system information or a system information update in the initial downlink BWP, the system information comprised in a SIB dedicated for the UEs of the first capability. In some aspects, the network entity may further transmit system information or a system information update in the initial downlink BWP, the system information including separate information dedicated for the UEs of the first capability in a SIB carrying information for the UEs of the first capability and the UEs of the second capability.

Performing the initial access may include receiving a random access preamble during a RO having an SSB-to-RO mapping based on a CD-SSB. Performing the initial access may include receiving a random access preamble during a RO having an SSB-to-RO mapping or an SSB-to-preamble mapping that is configured for the UEs having the first capability.

In some aspects, the network entity may further transmit a configuration for the active downlink BWP and the active uplink BWP. The configuration for the active downlink BWP may include one or more of: a periodic or semi-static TRS, a periodic or semi-static CSI-RS, a CSS or CORESET for paging, system information update, WUS or group common power control, a non-CD SSB, an additional CORESET or an additional CSS for system information update, a re-synchronization reference signal for UE synchronization in discontinuous reception (DRX) mode and indicating the system information update, or a layer 3 (L3) intra-frequency measurement gap. The configuration may be transmitted in system information dedicated for the UEs having the first capability. The configuration may be transmitted in RRC signaling for the UE. The configuration of the active downlink BWP or the active uplink BWP may be based on a rule or look up table.

In some aspects, the network entity may further perform a capability signaling procedure to learn that the UE has the first capability, where the network entity switches to the active downlink BWP and the active uplink BWP after completing the capability signaling procedure and based on at least one of: a MAC-CE, an RRC reconfiguration, DCI or a timer configured in system information.

In some aspects, the network entity may further transmit a first configuration of the second initial downlink BWP that is dedicated for the UEs having the first capability and may receive a second configuration of the active downlink BWP. In some aspects, the first configuration of the second initial downlink BWP may be transmitted, within the first initial downlink BWP, in a SIB that is dedicated for the UEs of the first capability. In some aspects, the first configuration of the second initial downlink BWP may be transmitted, within the first initial downlink BWP, as information dedicated for the UEs of the first capability in a SIB carrying information for the UEs of the first capability and the UEs of the second capability. In some aspects, the first configuration of the second initial downlink BWP may be transmitted in system information, within a CORESET 0, the system information being dedicated for the UEs of the first capability. In some aspects, the second configuration of the active downlink BWP may be received in the second initial downlink BWP. In some aspects, a configuration of the second initial downlink BWP may be based on a look up table or a rule.

Figure 17:
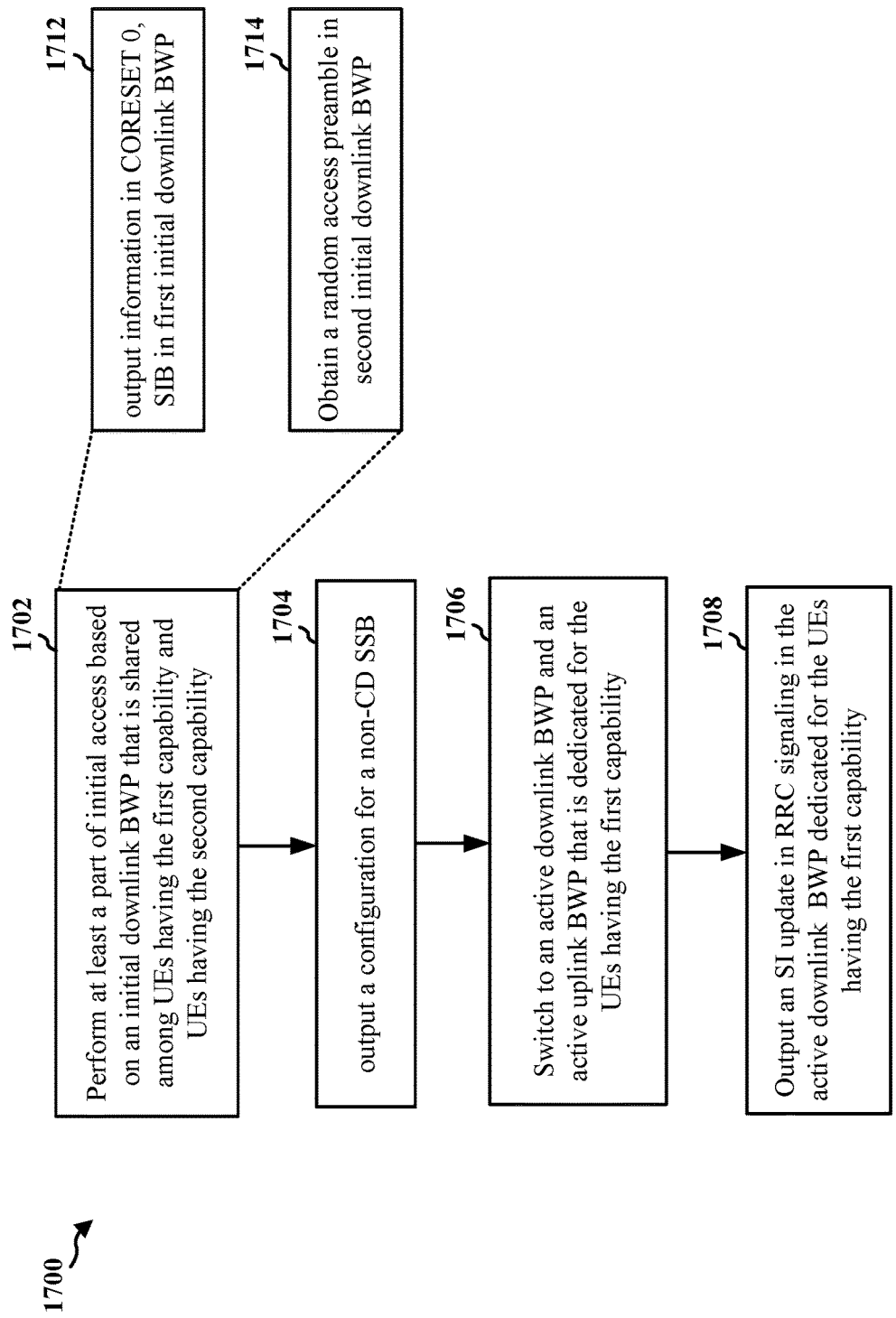
FIG. 17 is a flowchart of a method of wireless communication at a network entity in accordance with various aspects presented herein.

FIG. 17 is a flowchart 1700 of a method of wireless communication. The method may be performed by a network entity, such as a base station or a component of a base station (e.g., the base station 102/180, 310, 904, 1104; the network entity 1802). The method may provide a configuration of BWPs for and after initial access that provides reduced bandwidths supported by the reduced capability UEs while maintaining flexibility in configuring bandwidth for higher capability UEs. The network entity performing the method may support communication with one or more UEs having a first capability associated with a lower maximum UE bandwidth than a second capability and one or more UEs of the second capability. For example, the base station may communicate with reduced capability UEs and higher capability UEs.

At 1702, the network entity may perform an initial access having a first capability associated with a lower maximum UE bandwidth than a second capability, at least a part of the initial access being based on an initial downlink BWP that is shared among UEs having the first capability and UEs having the second capability. The initial access may be performed, e.g., by the BWP component 199, e.g., of the base station 102 or 310, or network entity 1802. FIG. 11 illustrates an example of a base station 1104 that performs part of an initial access in a shared initial DL BWP and part of the initial access in a dedicated DL BWP for reduced capability UEs.

As illustrated at 1704, the network entity may output a configuration for a non-CD SSB in the active downlink BWP dedicated for the UEs having the first capability. The non-CD SSB may be for L1 and/or L3 measurements by a UE in the active downlink BWP dedicated for the UEs having the first capability. The output may be performed, e.g., by the BWP component 199, e.g., of the base station 102 or 310, or network entity 1802.

At 1706, the network entity may switch, for communication with the UE, to an active downlink BWP and an active uplink BWP that are dedicated for the UEs having the first capability. The switching may be performed, e.g., by the BWP component 199 of the network entity 1802 in FIG. 18. FIGS. 9 and 11 illustrate examples of base stations 904 and 1104 switching to a dedicated active DL BWP for reduced capability UEs.

For example, the network entity may perform the initial access with a UE based on an initial uplink BWP dedicated for the UEs having the first capability. As an example, the network entity may perform the initial access based partially on a first initial downlink BWP shared among the UEs having the first capability and the UEs having the second capability and partially based on a second initial downlink BWP that is dedicated for the UEs having the first capability. The initial downlink BWP may include a CORESET 0 and CD-SSB that is configured for the UEs having the first capability and the UEs having the second capability. As illustrated at 1712, the network entity may output for transmission a first configuration of the second initial downlink BWP that is dedicated for the UEs having the first capability, where the first configuration of the second initial downlink BWP is received within the first initial downlink BWP, in a SIB carrying information for the UEs of the first capability and the UEs of the second capability. The second initial downlink BWP that is dedicated for the UEs having the first capability may not include the CORESET 0 or the CD-SSB. As illustrated at 1714, the network entity may obtain, e.g., receive, a random access preamble during an RO in the second initial downlink BWP, the RO having an SSB-to-RO mapping to the CD-SSB in the first initial downlink BWP.

As illustrated at 1708, the network entity may output a system information update in RRC signaling in the active downlink BWP dedicated for the UEs having the first capability. The output may be performed, e.g., by the BWP component 199, e.g., of the UE 104, 350, or the apparatus 1504. FIG. 10 shows an example of an active downlink BWP 1014 for UEs having a reduced bandwidth capability, the dedicated, active downlink BWP including RRC signaling for system information (SI) updates.

In some aspects, the UE may receive a first configuration of the second initial downlink BWP that is dedicated for the UEs having the first capability. The UE may also receive, in the second initial downlink BWP, a second configuration of the active downlink BWP. The reception may be performed, e.g., by the by the BWP component 199, e.g., of the base station 102 or 310, or network entity 1802.

FIG. 9 illustrates an example of a base station 904 performing initial access in a shared initial DL BWP. In some aspects, the network entity may perform the initial access based partially on a first initial downlink BWP shared among the UEs having the first capability and the UEs having the second capability and partially based on a second initial downlink BWP that is dedicated for the UEs having the first capability. The network entity may perform the initial access based on an initial uplink BWP dedicated for the UEs having the first capability. The network entity may configure BWP switching of the reduced capability UEs for a TDD mode, an FD-FDD mode, or an HD-FDD mode.

Performing the initial access may include receiving a random access preamble during a RO having an SSB-to-RO mapping for the UEs having the first capability that is different than for the UEs having the second capability. The SSB-to-RO mapping for the UEs having the first capability is based on a non-CD SSB. One or more parameter for the non-CD SSB may be configured independently from a CD-SSB, the one or more parameter including at least one of: a periodicity, a block index, a spatial reference for a random access procedure, a power offset, a center frequency, or a numerology. One or more parameter for the non-CD SSB may be the same parameter as for a CD-SSB, the one or more parameter including at least one of: a periodicity, a block index, a spatial reference for a random access procedure, a power offset, a center frequency, or a numerology. The one or more parameter may be from at least one of system information, a broadcast physical downlink control channel, a look up table, or a rule. The non-CD SSB may be configured in at least one of the second initial downlink BWP or the active downlink BWP and is common to measurement by the UEs of the first capability and the UEs of the second capability. At least one of the second initial downlink BWP or the active downlink BWP may overlap in frequency with the CD-SSB or a CORESET 0 of the first initial downlink BWP. The initial downlink BWP may include a CORESET 0 and CD-SSB that is configured for the UEs having the first capability and the UEs having the second capability, and wherein the first initial downlink BWP and the initial uplink BWP have a same or different center frequencies and a same or different bandwidth, the bandwidth of the initial DL BWP and the bandwidth of the initial UL BWP being no more than the lower maximum UE bandwidth of the UEs having the first capability and the second capability. The initial uplink BWP and the second initial downlink BWP may be at an edge of the carrier bandwidth.

At 1706, the network entity switches, for communication with the UE, to an active downlink BWP and an active uplink BWP that are dedicated for the UEs having the first capability. The switching may be performed, e.g., by the by the BWP component 199, e.g., of the base station 102 or 310, or network entity 1802. FIGS. 9 and 11 illustrate examples of base stations 904 and 1104 switching to a dedicated active DL BWP for reduced capability UEs. In some aspects, the network entity may perform the initial access, at 1702, based on the initial downlink BWP and an initial uplink BWP that is shared among the UEs having the first capability and the UEs having the second capability, and the base station may switch to the active downlink BWP and the active uplink BWP that are dedicated for the UEs having the first capability after performing the initial access. FIG. 9 illustrates example aspects of the base station 904 using a shared initial DL BWP and shared initial UL BWP. The initial downlink BWP may include a CORESET 0 and CD-SSB that is configured for the UEs having the first capability and the UEs having the second capability, where the initial downlink BWP and the initial uplink BWP have a bandwidth at a center frequency of a carrier bandwidth, the bandwidth being no more than the lower maximum UE bandwidth of the UEs having the first capability.

In some aspects, the network entity may further output for transmission, e.g., transmit, system information or a system information update in the initial downlink BWP, the system information comprised in a SIB dedicated for the UEs of the first capability. In some aspects, the network entity may further transmit system information or a system information update in the initial downlink BWP, the system information including separate information dedicated for the UEs of the first capability in a SIB carrying information for the UEs of the first capability and the UEs of the second capability.

Performing the initial access may include receiving a random access preamble during a RO having an SSB-to-RO mapping based on a CD-SSB. Performing the initial access may include receiving a random access preamble during a RO having an SSB-to-RO mapping or an SSB-to-preamble mapping that is configured for the UEs having the first capability.

In some aspects, the base station may further transmit a configuration for the active downlink BWP and the active uplink BWP. The configuration for the active downlink BWP may include one or more of: a periodic or semi-static TRS, a periodic or semi-static CSI-RS, a CSS or CORESET for paging, system information update, WUS or group common power control, a non-CD SSB, an additional CORESET or an additional CSS for system information update, a re-synchronization reference signal for UE synchronization in discontinuous reception (DRX) mode and indicating the system information update, or an L3 intra-frequency measurement gap if an SSB is not transmitted in the active downlink BWP. The configuration may be transmitted in system information dedicated for the UEs having the first capability. The configuration may be transmitted in RRC signaling for the UE. The configuration of the active downlink BWP or the active uplink BWP may be based on a rule or look up table.

In some aspects, the base station may further perform a capability signaling procedure to learn that the UE has the first capability, wherein the base station switches to the active downlink BWP and the active uplink BWP after completing the capability signaling procedure and based on at least one of: a MAC-CE, an RRC reconfiguration, DCI) or a timer configured in system information.

In some aspects, the base station may further transmit a first configuration of the second initial downlink BWP that is dedicated for the UEs having the first capability and may receive a second configuration of the active downlink BWP. In some aspects, the first configuration of the second initial downlink BWP may be transmitted, within the first initial downlink BWP, in a SIB that is dedicated for the UEs of the first capability. In some aspects, the first configuration of the second initial downlink BWP may be transmitted, within the first initial downlink BWP, as information dedicated for the UEs of the first capability in a SIB carrying information for the UEs of the first capability and the UEs of the second capability. In some aspects, the first configuration of the second initial downlink BWP may be transmitted in system information, within a CORESET 0, the system information being dedicated for the UEs of the first capability. In some aspects, the second configuration of the active downlink BWP may be received in the second initial downlink BWP. In some aspects, a configuration of the second initial downlink BWP may be based on a look up table or a rule.

Figure 18:
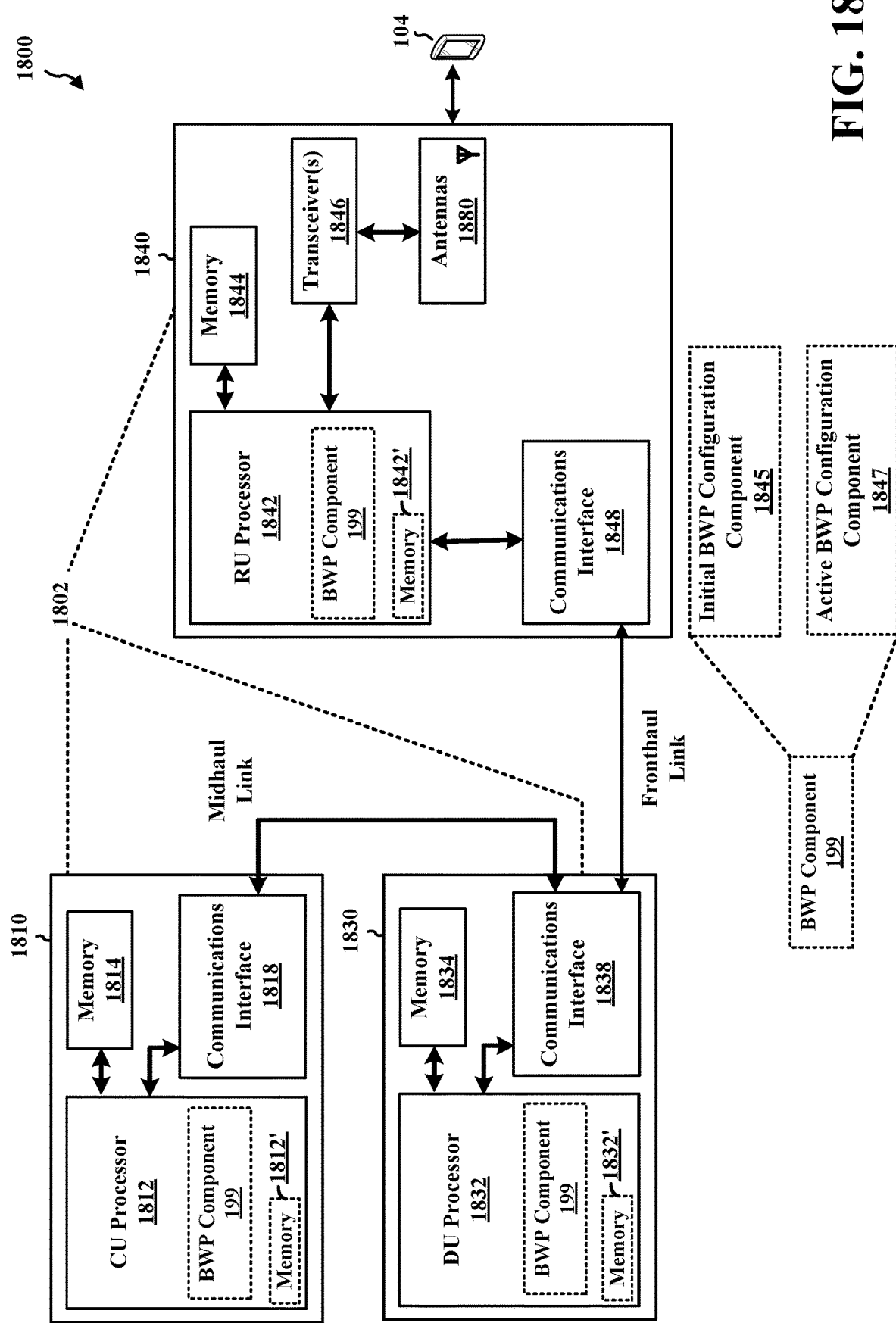
FIG. 18 is a diagram illustrating an example of a hardware implementation for an example network entity in accordance with various aspects presented herein.

FIG. 18 is a diagram 1800 illustrating an example of a hardware implementation for a network entity 1802. The network entity 1802 may be a base station, a component of a base station, or may implement base station functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

The network entity 1802 may include a BWP component 199, e.g., as described in connection with any of FIG. 1, 3, 16, or 17. The BWP component 199 may be configured to perform at least a part of initial access based on an initial downlink BWP that is shared among UEs having the first capability and UEs having the second capability, e.g., as described in connection with 1602 in FIG. 16, and to switch to an active downlink BWP and an active uplink BWP that are dedicated for the UEs having the first capability, e.g., as described in connection with 1604 in FIG. 16. In some aspects, the BWP component 199 may include an initial BWP configuration component 1845 that is configured to perform at least a part of initial access based on an initial downlink BWP that is shared among UEs having the first capability and UEs having the second capability, e.g., as described in connection with 1602 in FIG. 16. The BWP component 199 may further include an active BWP configuration component 1847 that is configured to switch to an active downlink BWP and an active uplink BWP that are dedicated for the UEs having the first capability, e.g., as described in connection with 1604 in FIG. 16.

The network entity 1802 may include additional components that perform each of the blocks of the algorithm in the flowchart of FIG. 16, FIG. 17, and/or the aspects performed by the base station in FIG. 9 or 11. As such, each block in the flowchart of FIG. 16, FIG. 17, and/or the aspects performed by the base station in FIG. 9 or 11, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the network entity 1802 may include a variety of components configured for various functions. In one configuration, the network entity 1802 may include means for performing an initial access with a UE having a first capability associated with a lower maximum UE bandwidth than a second capability, at least a part of the initial access being based on an initial downlink BWP that is shared among UEs having the first capability and UEs having the second capability and means for switching, for communication with the UE, to an active downlink BWP and an active uplink BWP that are dedicated for the UEs having the first capability. The network entity 1802 may further include means for transmitting system information in the initial downlink BWP, the system information comprised in a SIB dedicated for the UEs of the first capability. The network entity 1802 may further include means for transmitting system information in the initial downlink BWP, the system information including separate information dedicated for the UEs of the first capability in a SIB carrying information for the UEs of the first capability and the UEs of the second capability. The network entity 1802 may further include means for transmitting a configuration for the active downlink BWP and the active uplink BWP. The network entity 1802 may further include means for receiving capability signaling indicating that the UE has the first capability, wherein the base station switches to the active downlink BWP and the active uplink BWP after receiving the capability signaling procedure. The network entity 1802 may further include means for transmitting a first configuration of the second initial downlink BWP that is dedicated for the UEs having the first capability; and means for transmitting a second configuration of the active downlink BWP. The network entity 1802 may further include means for performing the initial access based partially on a first initial downlink BWP shared among the UEs having the first capability and the UEs having the second capability and partially based on a second initial downlink BWP that is dedicated for the UEs having the first capability, where the initial downlink BWP includes a CORESET 0 and CD-SSB that is configured for the UEs having the first capability and the UEs having the second capability. The network entity 1802 may further include means for outputting for transmission a first configuration of the second initial downlink BWP that is dedicated for the UEs having the first capability, wherein the first configuration of the second initial downlink BWP is received within the first initial downlink BWP, in a SIB carrying information for the UEs of the first capability and the UEs of the second capability, wherein the second initial downlink BWP that is dedicated for the UEs having the first capability does not include the CORESET 0 or the CD-SSB. The network entity 1802 may further include means for obtaining a random access preamble during a RO in the second initial downlink BWP, the RO having an SSB-to-RO mapping to the CD-SSB in the first initial downlink BWP. The network entity 1802 may further include means for outputting for transmission a configuration for a non-CD SSB in the active downlink BWP dedicated for the UEs having the first capability, the non-CD SSB being for at least one of an L1 or an L3 measurement for the UEs having the first capability. The network entity 1802 may include means for performing any of the aspects of the algorithm in the flowchart of FIG. 16, FIG. 17, and/or the aspects performed by the base station in FIG. 9 or 11. The means may be one or more of the components of the network entity 1802 configured to perform the functions recited by the means. As described supra, the network entity 1802 may include the TX Processor 316, the RX Processor 370, and the controller/processor 375. As such, in one configuration, the means may be the TX Processor 316, the RX Processor 370, and the controller/processor 375 configured to perform the functions recited by the means described in connection with FIG. 3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" indicate "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE having a first capability associated with a lower maximum UE bandwidth than a second capability, comprising: performing at least a part of initial access based on a first initial downlink BWP that is shared among UEs having the first capability and UEs having the second capability; and switching, after the initial access, to an active downlink BWP and an active uplink BWP that are dedicated for the UEs having the first capability.

In aspect 2, the method of aspect 1 further includes that the UE performs the initial access based on the first initial downlink BWP and an initial uplink BWP that is shared among the UEs having the first capability and the UEs having the second capability, wherein the UE switches to the active downlink BWP and the active uplink BWP that are dedicated for the UEs having the first capability after performing the initial access, and BWP switching of the UE being configured for a TDD mode, a FD-FDD mode, or a HD-FDD mode.

In aspect 3, the method of aspect 1 or aspect 2 further includes that the first initial downlink BWP includes a CORESET 0 or a CD-SSB that is configured for the UEs having the first capability and the UEs having the second capability, and wherein the first initial downlink BWP and the initial uplink BWP have a same or different center frequencies and a same or different bandwidth, a first bandwidth of the first initial downlink BWP and a second bandwidth of the initial uplink BWP being no more than the lower maximum UE bandwidth of the UEs having the first capability and the second capability.

In aspect 4, the method of any of aspects 1-3 further includes receiving system information or a system information update in the first initial downlink BWP, the system information comprised in a SIB dedicated for the UEs of the first capability.

In aspect 5, the method of any of aspects 1-3 further includes receiving system information or a system information update in the first initial downlink BWP, the system information including separate information dedicated for the UEs of the first capability in a SIB carrying information for the UEs of the first capability and the UEs of the second capability.

In aspect 6, the method of any of aspects 1-5 further includes performing the initial access includes transmitting a random access preamble during an RO having an SSB-to-RO mapping based on a CD-SSB.

In aspect 7, the method of any of aspects 1-5 further includes performing the initial access includes transmitting a random access preamble during a RO having an SSB-to-RO mapping or an SSB-to-preamble mapping that is configured for the UEs having the first capability.

In aspect 8, the method of any of aspects 1-7 further includes receiving a configuration for the active downlink BWP and the active uplink BWP, the configuration for the active downlink BWP including one or more of: a periodic or semi-static TRS, a periodic or semi-static CSI-RS, a periodic or semi-static PRS, a CSS or CORESET for paging, system information update, WUS or group common power control, a non-CD SSB, an additional CORESET or an additional CSS for the system information update, a re-synchronization reference signal for UE synchronization in DRX mode and indicating the system information update, or a L3 intra-frequency measurement gap if an SSB is not transmitted in the active downlink BWP.

In aspect 9, the method of aspect 8 further includes that the configuration is received in system information dedicated for the UEs having the first capability.

In aspect 10, the method of aspect 8 further includes that the configuration is received in RRC signaling for the UE.

In aspect 11, the method of any of aspects 1-7 further includes that a configuration of the active downlink BWP or the active uplink BWP is based on a rule or look up table.

In aspect 12, the method of any of aspects 1-11 further includes performing a capability signaling procedure indicating that the UE has the first capability, wherein the UE switches to the active downlink BWP and the active uplink BWP after completing the capability signaling procedure and based on at least one of: a MAC-CE, an RRC reconfiguration, DCI, or a timer configured in system information for the UEs having the first capability.

In aspect 13, the method of aspect 1 further includes that the UE performs the initial access based partially on a first initial downlink BWP shared among the UEs having the first capability and the UEs having the second capability and partially based on a second initial downlink BWP that is dedicated for the UEs having the first capability.

In aspect 14, the method of aspect 1 or aspect 13 further includes that the UE performs the initial access based on an initial uplink BWP dedicated for the UEs having the first capability.

In aspect 15, the method of aspect 14 further includes that performing the initial access includes transmitting a random access preamble during a RO having an SSB-to-RO mapping for the UEs having the first capability that is different than for the UEs having the second capability.

In aspect 16, the method of aspect 15 further includes that the SSB-to-RO mapping for the UEs having the first capability is based on a non-CD SSB.

In aspect 17, the method of aspect 13, 15, or 16 further includes that one or more parameter for the non-CD SSB is a same parameter as for a CD-SSB, the one or more parameter including at least one of: a periodicity, a block index, a spatial reference for a random access procedure, a power offset, a center frequency, or a numerology.

In aspect 18, the method of aspect 13, 15, or 16 further includes that one or more parameter for the non-CD SSB configured independently from a CD-SSB, the one or more parameter including at least one of: a periodicity, a block index, a spatial reference for a random access procedure, a power offset, a center frequency, or a numerology.

In aspect 19, the method of aspect 18 further includes that the one or more parameters are from at least one of system information, a broadcast physical downlink control channel, a look up table, or a rule.

In aspect 20, the method of aspect 16 further includes that the non-CD SSB is configured in at least one of the second initial downlink BWP or the active downlink BWP and is common to measurement by the UEs of the first capability and the UEs of the second capability.

In aspect 21, the method of aspect 16 further includes that at least one of the second initial downlink BWP or the active downlink BWP overlaps in frequency with a CD-SSB or a CORESET 0 of the first initial downlink BWP.

In aspect 22, the method of aspect 13 or 14 further includes that the first initial downlink BWP includes a CORESET 0 and CD-SSB that is configured for the UEs having the first capability and the UEs having the second capability, and wherein the first initial downlink BWP has a bandwidth at a center frequency of a carrier bandwidth, the bandwidth being no more than the lower maximum UE bandwidth of the UEs having the first capability, and wherein the initial uplink BWP and the second initial downlink BWP are at an edge of the carrier bandwidth.

In aspect 23, the method of any of aspects 1 or 13-22 further includes receiving a first configuration of the second initial downlink BWP that is dedicated for the UEs having the first capability; and receiving a second configuration of the active downlink BWP.

In aspect 24, the method of aspect 23 further includes that the first configuration of the second initial downlink BWP is received, within the first initial downlink BWP, in a SIB that is dedicated for the UEs of the first capability.

In aspect 25, the method of aspect 23 further includes that the first configuration of the second initial downlink BWP is received, within the first initial downlink BWP, as information dedicated for the UEs of the first capability in a SIB carrying information for the UEs of the first capability and the UEs of the second capability.

In aspect 26, the method of aspect 23 further includes that the first configuration of the second initial downlink BWP is received in system information, within a CORESET 0, the system information being dedicated for the UEs of the first capability.

In aspect 27, the method of aspect 23 further includes that the second configuration of the active downlink BWP is received in the second initial downlink BWP.

In aspect 28, the method of any of aspects 1 or 13-22 further includes that a configuration of the second initial downlink BWP is based on a look up table or a rule.

In aspect 29, the method of aspect 1 further includes performing the initial access based partially on a first initial downlink BWP shared among the UEs having the first capability and the UEs having the second capability and partially based on a second initial downlink BWP that is dedicated for the UEs having the first capability.

In aspect 30, the method of aspect 29 further includes that the first initial downlink BWP includes a CORESET 0 and CD-SSB that is configured for the UEs having the first capability and the UEs having the second capability.

In aspect 31, the method of aspect 29 or aspect 30 further includes receiving a first configuration of the second initial downlink BWP that is dedicated for the UEs having the first capability, wherein the first configuration of the second initial downlink BWP is received within the first initial downlink BWP, in a SIB carrying information for the UEs of the first capability and the UEs of the second capability.

In aspect 32, the method of any of aspects 29-31 further includes that the second initial downlink BWP that is dedicated for the UEs having the first capability does not include the CORESET 0 or the CD-SSB.

In aspect 33, the method of any of aspects 29-32, further including that performing perform the initial access includes transmitting a random access preamble during a RO in the second initial downlink BWP, the RO having an SSB-to-RO mapping to the CD-SSB in the first initial downlink BWP.

In aspect 34, the method of any of aspects 29-33, further including receiving a configuration for a non-CD SSB in the active downlink BWP dedicated for the UEs having the first capability.

In aspect 35, the method of aspect 34 further includes performing at least one of a L1 or a L3 measurement on the non-CD SSB in the active downlink BWP dedicated for the UEs having the first capability.

In aspect 36, the method of any of aspects 29-35 further includes receiving a system information update in RRC signaling in the active downlink BWP dedicated for the UEs having the first capability.

In aspect 37, the method of any of aspects 29-36 further includes receiving a first configuration of the second initial downlink BWP that is dedicated for the UEs having the first capability; and receiving, in the second initial downlink BWP, a second configuration of the active downlink BWP.

Aspect 38 is an apparatus for wireless communication at a UE having a first capability associated with a lower maximum UE bandwidth than a second capability, the apparatus, comprising: a memory; and at least one processor coupled to the memory, based at least in part on stored information in the memory, the at least one processor is configured to perform the method of any of aspects 1-37.

Aspect 39 is an apparatus for wireless communication at a UE having a first capability associated with a lower maximum UE bandwidth than a second capability, the apparatus, comprising means to perform the method of any of aspects 1-37.

In aspect 40, the apparatus of aspect 38 or 39 further includes at least one or an antenna or a transceiver.

Aspect 41 is a non-transitory computer-readable medium storing computer executable code at a UE having a first capability associated with a lower maximum UE bandwidth than a second capability, the code when executed by a processor causes the processor to perform the method of any of aspects 1-37.

Aspect 42 is a method of wireless communication at a network entity, comprising: performing an initial access with a UE having a first capability associated with a lower maximum UE bandwidth than a second capability, at least a part of the initial access being based on a first initial downlink BWP that is shared among UEs having the first capability and UEs having the second capability; and switching, for communication with the UE, to an active downlink BWP and an active uplink BWP that are dedicated for the UEs having the first capability.

In aspect 43, the method of aspect 42 further includes that the base station performs the initial access based on the first initial downlink BWP and an initial uplink BWP that is shared among the UEs having the first capability and the UEs having the second capability and switches to the active downlink BWP and the active uplink BWP that are dedicated for the UEs having the first capability after performing the initial access.

In aspect 44, the method of aspect 42 or aspect 43 further includes that the first initial downlink BWP includes a CORESET 0 and CD-SSB that is configured for the UEs having the first capability and the UEs having the second capability, and wherein the first initial downlink BWP and the initial uplink BWP have a bandwidth at a center frequency of a carrier bandwidth, the bandwidth being no more than the lower maximum UE bandwidth of the UEs having the first capability.

In aspect 45, the method of any of aspects 42-44 further includes transmitting system information in the first initial downlink BWP, the system information comprised in a SIB dedicated for the UEs of the first capability.

In aspect 46, the method of any of aspects 42-44 further includes transmitting system information in the first initial downlink BWP, the system information including separate information dedicated for the UEs of the first capability in a SIB carrying information for the UEs of the first capability and the UEs of the second capability.

In aspect 47, the method of any of aspects 42-46 further includes performing the initial access includes receiving a random access preamble from the UE during a RO having an SSB-to-RO mapping based on a CD-SSB.

In aspect 48, the method of any of aspects 42-46 further includes performing the initial access includes receiving a random access preamble from the UE during a RO having an SSB-to-RO mapping or an SSB-to-preamble mapping that is configured for the UEs having the first capability.

In aspect 49, the method of any of aspects 42-48 further includes transmitting a configuration for the active downlink BWP and the active uplink BWP, the configuration for the active downlink BWP including one or more of: a periodic or semi-static TRS, a periodic or semi-static CSI-RS, a periodic or semi-static PRS, a CSS or CORESET for paging, system information update, WUS or group common power control, a non-CD SSB, a re-synchronization reference signal for UE synchronization in DRX mode and indicating the system information update, or a L3 intra-frequency measurement gap if an SSB is not transmitted in the active downlink BWP.

In aspect 50, the method of aspect 49 further includes that the configuration is transmitted in system information dedicated for the UEs having the first capability.

In aspect 51, the method of aspect 49 further includes that the configuration is transmitted in RRC signaling to the UE.

In aspect 52, the method of any of aspects 42-48 further includes that a configuration of the active downlink BWP or the active uplink BWP is based on a rule or look up table.

In aspect 53, the method of any of aspects 42-52 further includes receiving capability signaling indicating that the UE has the first capability, wherein the base station switches to the active downlink BWP and the active uplink BWP after receiving the capability signaling and based on at least one of: a MAC-CE, an RRC reconfiguration, DCI, or a timer configured in system information for the UEs having the first capability.

In aspect 54, the method of aspect 42 further includes that the initial access is based partially on a first initial downlink BWP shared among the UEs having the first capability and the UEs having the second capability and partially based on a second initial downlink BWP that is dedicated for the UEs having the first capability.

In aspect 55, the method of aspect 42 or 54 further includes that the initial access is further based on an initial uplink BWP dedicated for the UEs having the first capability.

In aspect 56, the method of any of aspect 54 or 55 further includes that performing the initial access includes receiving a random access preamble from the UE during a RO having an SSB-to-RO mapping for the UEs having the first capability that is different than for the UEs having the second capability.

In aspect 57, the method of aspect 56 further includes that the SSB-to-RO mapping for the UEs having the first capability is based on a non-CD SSB.

In aspect 58, the method of aspect 57 further includes that one or more parameter for the non-CD SSB is a same parameter as for a CD-SSB, the one or more parameter including at least one of: a periodicity, a block index, a spatial reference for a random access procedure, a power offset, center frequency, or a numerology.

In aspect 59, the method of aspect 57 further includes that one or more parameter for the non-CD SSB configured independently from a CD-SSB, the one or more parameter including at least one of: a periodicity, a block index, a spatial reference for a random access procedure, a power offset, center frequency, or a numerology.

In aspect 60, the method of any of aspects 57-59 further includes that the one or more parameters are from at least one of system information, a broadcast physical downlink control channel, a look up table, or a rule.

In aspect 61, the method of any of aspects 57-59 further includes that the non-CD SSB is configured in at least one of the second initial downlink BWP or the active downlink BWP and is common to measurement by the UEs of the first capability and the UEs of the second capability.

In aspect 62, the method of any of aspects 54-61 further includes that at least one of the second initial downlink BWP or the active downlink BWP overlaps in frequency with a CD-SSB or a CORESET 0 of the first initial downlink BWP.

In aspect 63, the method of any of aspects 54-62 further includes that the first initial downlink BWP includes a CORESET 0 and CD-SSB that is configured for the UEs having the first capability and the UEs having the second capability, and wherein the first initial downlink BWP has a bandwidth at a center frequency of a carrier bandwidth, the bandwidth being no more than the lower maximum UE bandwidth of the UEs having the first capability, and wherein the initial uplink BWP and the second initial downlink BWP are at an edge of the carrier bandwidth.

In aspect 64, the method of any of aspects 54-63 further includes transmitting a first configuration of the second initial downlink BWP that is dedicated for the UEs having the first capability; and transmitting a second configuration of the active downlink BWP.

In aspect 65, the method of aspect 64 further includes that the first configuration of the second initial downlink BWP is transmitted, within the first initial downlink BWP, in a SIB that is dedicated for the UEs of the first capability.

In aspect 66, the method of aspect 64 further includes that the first configuration of the second initial downlink BWP is transmitted, within the first initial downlink BWP, as information dedicated for the UEs of the first capability in a SIB carrying information for the UEs of the first capability and the UEs of the second capability.

In aspect 67, the method of any of aspects 64-66 further includes that the first configuration of the second initial downlink BWP is transmitted in system information, within a CORESET 0, the system information being dedicated for the UEs of the first capability.

In aspect 68, the method of aspect 64 further includes that the second configuration of the active downlink BWP is transmitted in the second initial downlink BWP.

In aspect 69, the method of any of aspects 42-63 further includes that a configuration of the second initial downlink BWP is based on a look up table or a rule.

In aspect 70, the method of aspect 42 further includes performing the initial access based partially on a first initial downlink BWP shared among the UEs having the first capability and the UEs having the second capability and partially based on a second initial downlink BWP that is dedicated for the UEs having the first capability, where the first initial downlink BWP includes a CORESET 0 and CD-SSB that is configured for the UEs having the first capability and the UEs having the second capability.

In aspect 71, the method of aspect 70 further includes outputting for transmission a first configuration of the second initial downlink BWP that is dedicated for the UEs having the first capability, wherein the first configuration of the second initial downlink BWP is received within the first initial downlink BWP, in a SIB carrying information for the UEs of the first capability and the UEs of the second capability, wherein the second initial downlink BWP that is dedicated for the UEs having the first capability does not include the CORESET 0 or the CD-SSB.

In aspect 72, the method of aspect 70 or 71 further includes that performing the initial access includes obtaining a random access preamble during a RO in the second initial downlink BWP, the RO having an SSB-to-RO mapping to the CD-SSB in the first initial downlink BWP.

In aspect 73, the method of any of aspects 70-72 further includes outputting for transmission a configuration for a non-CD SSB in the active downlink BWP dedicated for the UEs having the first capability, the non-CD SSB being for at least one of an L1 or an L3 measurement for the UEs having the first capability.

In aspect 74, the method of any of aspects 70-73 further includes outputting for transmission system information update in RRC signaling in the active downlink BWP dedicated for the UEs having the first capability.

Aspect 75 is an apparatus for wireless communication at a network entity, the apparatus, comprising: a memory; and at least one processor coupled to the memory and, based at least in part on stored information in the memory, the at least one processor is configured to perform the method of any of aspects 42-74.

Aspect 76 is an apparatus for wireless communication at a network entity, the apparatus, comprising means to perform the method of any of aspects 42-74.

In aspect 77, the apparatus of aspect 75 or 76 further includes at least one of an antenna or a transceiver.

Aspect 78 is a non-transitory computer-readable medium storing computer executable code at a network entity, the code when executed by a processor causes the processor to perform the method of any of aspects 42-74.

Aspect 79 is a computer program product for wireless communication at a network entity, comprising instructions, which when the program is executed by a computer causes the network entity to carry out the method of any of aspects 42-74.

Aspect 80 is a computer program product for wireless communication at a UE, comprising instructions, which when the program is executed by a computer causes the UE to carry out the method of any of aspects 1-37.

Aspect 81 is an apparatus for wireless communication at a UE having a first capability associated with a lower maximum UE bandwidth than a second capability, comprising: a memory; and at least one processor coupled to the memory and, based at least in part on stored information in the memory, the at least one processor is configured to: perform at least a part of initial access based on a first initial downlink BWP that is shared among UEs having the first capability and UEs having the second capability; and switch, after the initial access, to an active downlink BWP and an active uplink BWP that are dedicated for the UEs having the first capability.

In aspect 82, the apparatus of aspect 81 further includes that the at least one processor is configured to perform the initial access based partially on the first initial downlink BWP shared among the UEs having the first capability and the UEs having the second capability and partially based on a second initial downlink BWP that is dedicated for the UEs having the first capability.

In aspect 83, the apparatus of aspect 82 further includes that the first initial downlink BWP includes a CORESET 0 and an CD-SSB that is configured for the UEs having the first capability and the UEs having the second capability.

In aspect 84, the apparatus of aspect 82 or 83 further includes that the at least one processor is further configured to: receive a first configuration of the second initial downlink BWP that is dedicated for the UEs having the first capability, wherein the first configuration of the second initial downlink BWP is received within the first initial downlink BWP, in a SIB carrying information for the UEs having the first capability and the UEs having the second capability.

In aspect 85, the apparatus of aspect 84 further includes that the second initial downlink BWP that is dedicated for the UEs having the first capability does not include the CORESET 0 or the CD-SSB.

In aspect 86, the apparatus of any of aspects 83-85 further includes that to perform the initial access, the at least one processor is configured to transmit a random access preamble during an RO in the second initial downlink BWP, the RO having an SSB-to-RO mapping to the CD-SSB in the first initial downlink BWP.

In aspect 87, the apparatus of any of aspects 81-86 further includes that the at least one processor is further configured to: receive a configuration for a non-CD SSB in the active downlink BWP dedicated for the UEs having the first capability.

In aspect 88, the apparatus of aspect 87 further includes that the at least one processor is further configured to: perform at least one of an L1 or an L3 measurement on the non-CD SSB in the active downlink BWP dedicated for the UEs having the first capability.

In aspect 89, the apparatus of any of aspects 81-88 further includes that the at least one processor is further configured to: receive a system information update in RRC signaling in the active downlink BWP dedicated for the UEs having the first capability.

In aspect 90, the apparatus of any of aspects 82-89 further includes that to perform the initial access, the at least one processor is configured to transmit a random access preamble during an RO in the second initial downlink BWP, the RO having an SSB-to-RO mapping based on a non-CD SSB.

In aspect 91, the apparatus of any of aspects 82-90 further includes that one or more parameters for a non-CD SSB, in the second initial downlink BWP or the active downlink BWP that is dedicated for the UEs having the first capability, include a same parameter as for a CD-SSB, the one or more parameters including at least one of: a periodicity, a block index, a spatial reference for a random access procedure, a power offset, a center frequency, or a numerology.

In aspect 92, the apparatus of aspect 91 further includes that the non-CD SSB is configured in at least one of the second initial downlink BWP or the active downlink BWP and is common to measurement by the UEs having the first capability and the UEs having the second capability.

In aspect 93, the apparatus of aspect 91 or 92 further includes that at least one of the second initial downlink BWP or the active downlink BWP overlaps in frequency with the CD-SSB or a CORESET 0 of the first initial downlink BWP.

In aspect 94, the apparatus of aspect 82 further includes that the first initial downlink BWP has a bandwidth at a center frequency of a carrier bandwidth, the bandwidth being no more than the lower maximum UE bandwidth of the UEs having the first capability, and wherein an initial uplink BWP and the second initial downlink BWP are at an edge of the carrier bandwidth.

In aspect 95, the apparatus of aspect 82 further includes that receive a first configuration of the second initial downlink BWP that is dedicated for the UEs having the first capability; and receive, in the second initial downlink BWP, a second configuration of the active downlink BWP.

In aspect 96, the apparatus of aspect 95 further includes that the first configuration of the second initial downlink BWP is received in one of: an SIB that is dedicated for the UEs having the first capability, within the first initial downlink BWP, or system information that is dedicated for the UEs having the first capability, within a CORESET 0.

In aspect 97, the apparatus of aspect 82 further includes that a configuration of the second initial downlink BWP is based on a look up table or a rule.

In aspect 98, the apparatus of aspect 81 further includes that the at least one processor is configured to perform the initial access based on the first initial downlink BWP and an initial uplink BWP that is shared among the UEs having the first capability and the UEs having the second capability, and to switch to the active downlink BWP and the active uplink BWP that are dedicated for the UEs having the first capability after the initial access, and BWP switching of the UE being configured for a TDD mode, a FD-FDD mode, or a HD-FDD mode, and wherein the first initial downlink BWP includes a CORESET 0 or a CD-SSB that is configured for the UEs having the first capability and the UEs having the second capability, and wherein the first initial downlink BWP and the initial uplink BWP have a same or different center frequencies and a same or different bandwidth, a first bandwidth of the first initial downlink BWP and second bandwidth of the initial uplink BWP being no more than the lower maximum UE bandwidth of the UEs having the first capability and the second capability.

In aspect 99, the apparatus of aspect 98 further includes that the at least one processor is further configured to: receive system information or a system information update in the first initial downlink BWP, the system information comprised in a first SIB dedicated for the UEs having the first capability, or receive the system information or the system information update in the first initial downlink BWP, the system information including separate information dedicated for the UEs having the first capability in a second SIB carrying the separate information for the UEs having the first capability and additional information for the UEs having the second capability.

In aspect 100, the apparatus of aspect 98 or 99 further includes that to perform the initial access, the at least one processor is configured to transmit a random access preamble during a first RO having a first SSB-to-RO mapping based on a CD-SSB, or transmit the random access preamble during a second RO having a second SSB-to-RO mapping or an SSB-to-preamble mapping that is configured for the UEs having the first capability.

In aspect 101, the apparatus of aspect 81 further includes that wherein the at least one processor is further configured to: receive a configuration for the active downlink BWP and the active uplink BWP, the configuration for the active downlink BWP including one or more of: a periodic or semi-static TRS, a periodic or semi-static CSI-RS, a periodic or semi-static PRS, a CSS or CORESET for paging, system information update, WUS or group common power control, a non-CD SSB, an additional CORESET or an additional CSS for the system information update, a re-synchronization reference signal for UE synchronization in DRX mode and indicating the system information update, or an L3 intra-frequency measurement gap if an SSB is not transmitted in the active downlink BWP.

In aspect 102, the apparatus of aspect 101 further includes that the configuration is comprised in system information dedicated for the UEs having the first capability or in RRC signaling for the UE.

In aspect 103, the apparatus of aspect 81 further includes that a configuration of the active downlink BWP or the active uplink BWP is based on a rule or look up table.

In aspect 104, the apparatus of any of aspects 81-103 further includes that the at least one processor is configured to perform a capability signaling procedure indicating that the UE has the first capability, wherein the at least one processor is configured to switch to the active downlink BWP and the active uplink BWP after completing the capability signaling procedure and based on at least one of: a MAC-CE, an RRC reconfiguration, DCI, or a timer configured in system information for the UEs having the first capability.

Aspect 105 is an apparatus for wireless communication at a network entity, comprising: a memory; and at least one processor coupled to the memory and, based at least in part on stored information in the memory, the at least one processor is configured to: perform an initial access with a UE having a first capability associated with a lower maximum UE bandwidth than a second capability, at least a part of the initial access being based on a first initial downlink BWP that is shared among UEs having the first capability and UEs having the second capability; and switch, for communication with the UE after the initial access, to an active downlink BWP and an active uplink BWP that are dedicated for the UEs having the first capability.

In aspect 106, the apparatus of aspect 105 further includes that the at least one processor is configured to perform the initial access based partially on a first initial downlink BWP shared among the UEs having the first capability and the UEs having the second capability and partially based on a second initial downlink BWP that is dedicated for the UEs having the first capability, wherein the first initial downlink BWP includes a CORESET 0 and CD-SSB that is configured for the UEs having the first capability and the UEs having the second capability.

In aspect 107, the apparatus of aspect 106 further includes that output for transmission a first configuration of the second initial downlink BWP that is dedicated for the UEs having the first capability, wherein the first configuration of the second initial downlink BWP is received within the first initial downlink BWP, in a SIB carrying information for the UEs having the first capability and the UEs of the second capability, wherein the second initial downlink BWP that is dedicated for the UEs having the first capability does not include the CORESET 0 or the CD-SSB.

In aspect 108, the apparatus of any of aspects 105-107 further includes that to perform the initial access, the at least one processor is configured to obtain a random access preamble during an RO in the second initial downlink BWP, the RO having an SSB-to-RO mapping to the CD-SSB in the first initial downlink BWP.

In aspect 109, the apparatus of any of aspects 105-108 further includes that the at least one processor is further configured to: output for transmission a configuration for a non-CD SSB in the active downlink BWP dedicated for the UEs having the first capability, the non-CD SSB being for at least one of an L1 or L3 measurement for the UEs having the first capability.

In aspect 110, the apparatus of any of aspects 105-109 further includes that the at least one processor is further configured to: output for transmission system information update in RRC signaling in the active downlink BWP dedicated for the UEs having the first capability.

What is claimed is:

1. An apparatus for wireless communication at a user equipment (UE) having a first capability associated with a lower maximum UE bandwidth than a second capability, comprising:
a memory; and
at least one processor coupled to the memory and, based at least in part on stored information in the memory, the at least one processor is configured to:
perform at least part of an initial access using a first initial downlink bandwidth part (BWP) that is shared among UEs having the first capability and UEs having the second capability; and
switch, after the at least part of the initial access, to an active downlink BWP and an active uplink BWP that are dedicated for the UEs having the first capability.

2. The apparatus of claim 1, wherein the at least one processor is configured to perform the initial access using the first initial downlink BWP shared among the UEs having the first capability and the UEs having the second capability and using a second initial downlink BWP that is dedicated for the UEs having the first capability.

3. The apparatus of claim 2, wherein the first initial downlink BWP includes a control resource set 0 (CORESET 0) and cell-defining synchronization signal block (CD-SSB) that is configured for the UEs having the first capability and the UEs having the second capability.

4. The apparatus of claim 3, wherein the at least one processor is further configured to:
receive a first configuration of the second initial downlink BWP that is dedicated for the UEs having the first capability, wherein the first configuration of the second initial downlink BWP is received within the first initial downlink BWP, in a system information block (SIB) carrying information for the UEs having the first capability and the UEs having the second capability.

5. The apparatus of claim 4, wherein the second initial downlink BWP that is dedicated for the UEs having the first capability does not include the CORESET 0 or the CD-SSB.

6. The apparatus of claim 3, wherein after the at least part of the initial access, the at least one processor is configured to transmit a random access preamble during a random access occasion (RO) in the second initial downlink BWP, the RO having a synchronization signal block (SSB)-to-RO mapping to the CD-SSB in the first initial downlink BWP.

7. The apparatus of claim 2, wherein the at least one processor is further configured to:
receive a configuration for a non-cell-defining SSB (non-CD SSB) in the active downlink BWP dedicated for the UEs having the first capability.

8. The apparatus of claim 7, wherein the at least one processor is further configured to:
perform at least one of a layer 1 (L1) or a layer 3 (L3) measurement on the non-CD SSB in the active downlink BWP dedicated for the UEs having the first capability.

9. The apparatus of claim 2, wherein the at least one processor is further configured to:
receive a system information update in radio resource control (RRC) signaling in the active downlink BWP dedicated for the UEs having the first capability.

10. The apparatus of claim 2, wherein after the at least part of the initial access, the at least one processor is configured to transmit a random access preamble during a random access occasion (RO) in the second initial downlink BWP, the RO having a synchronization signal block (SSB)-to-RO mapping based on a non-cell-defining SSB (non-CD SSB).

11. The apparatus of claim 2, wherein one or more parameters for a non-cell-defining SSB (non-CD SSB), in the second initial downlink BWP or the active downlink BWP that is dedicated for the UEs having the first capability, include a same parameter as for a CD-SSB, the one or more parameters including at least one of:
a periodicity,
a block index,
a spatial reference for a random access procedure,
a power offset,
a center frequency, or
a numerology.

12. The apparatus of claim 11, wherein the non-CD SSB is configured in at least one of the second initial downlink BWP or the active downlink BWP and is common to measurement by the UEs having the first capability and the UEs having the second capability.

13. The apparatus of claim 11, wherein at least one of the second initial downlink BWP or the active downlink BWP overlaps in frequency with the CD-SSB or a control resource set 0 (CORESET 0) of the first initial downlink BWP.

14. The apparatus of claim 2, wherein the first initial downlink BWP has a bandwidth at a center frequency of a carrier bandwidth, the bandwidth being no more than the lower maximum UE bandwidth of the UEs having the first capability, and
wherein an initial uplink BWP and the second initial downlink BWP are at an edge of the carrier bandwidth.

15. The apparatus of claim 2, wherein the at least one processor is further configured to:
receive a first configuration of the second initial downlink BWP that is dedicated for the UEs having the first capability; and
receive, in the second initial downlink BWP, a second configuration of the active downlink BWP.

16. The apparatus of claim 15, wherein the first configuration of the second initial downlink BWP is received in one of:
a system information block (SIB) that is dedicated for the UEs having the first capability, within the first initial downlink BWP, or
system information that is dedicated for the UEs having the first capability, within a control resource set 0 (CORESET 0).

17. The apparatus of claim 2, wherein a configuration of the second initial downlink BWP is based on a look up table or a rule.

18. The apparatus of claim 1, wherein the at least one processor is configured to perform the at least part of the initial access using the first initial downlink BWP and an initial uplink BWP that is shared among the UEs having the first capability and the UEs having the second capability, and to switch to the active downlink BWP and the active uplink BWP that are dedicated for the UEs having the first capability after the at least part of the initial access, and BWP switching of the UE being configured for a time division duplex (TDD) mode, a full-duplex frequency division duplex (FD-FDD) mode, or a half-duplex frequency division duplex (HD-FDD) mode, and wherein the first initial downlink BWP includes a control resource set 0 (CORESET 0) or a cell-defining synchronization signal block (CD-SSB) that is configured for the UEs having the first capability and the UEs having the second capability, and wherein the first initial downlink BWP and the initial uplink BWP have a same or different center frequencies and a same or different bandwidth, a first bandwidth of the first initial downlink BWP and second bandwidth of the initial uplink BWP being no more than the lower maximum UE bandwidth of the UEs having the first capability and the second capability.

19. The apparatus of claim 18, wherein the at least one processor is further configured to:
receive system information or a system information update in the first initial downlink BWP, the system information comprised in a first system information block (SIB) dedicated for the UEs having the first capability, or
receive the system information or the system information update in the first initial downlink BWP, the system information including separate information dedicated for the UEs having the first capability in a second SIB carrying the separate information for the UEs having the first capability and additional information for the UEs having the second capability.

20. The apparatus of claim 18, wherein to after the at least part of the initial access, the at least one processor is configured to:
transmit a random access preamble during a first random access occasion (RO) having a first synchronization signal block (SSB)-to-RO mapping based on a cell-defining SSB (CD-SSB), or
transmit the random access preamble during a second RO having a second SSB-to-RO mapping or an SSB-to-preamble mapping that is configured for the UEs having the first capability.

21. The apparatus of claim 1, wherein the at least one processor is further configured to:
receive a configuration for the active downlink BWP and the active uplink BWP, the configuration for the active downlink BWP including one or more of:
a periodic or semi-static tracking reference signal (TRS),
a periodic or semi-static channel state information reference signal (CSI-RS),
a periodic or semi-static positioning reference signal (PRS),
a common search space (CSS) or control resource set (CORESET) for paging, system information update, wake-up signal (WUS) or group common power control,
a non-cell-defining synchronization signal block (non-CD SSB),
an additional CORESET or an additional CSS for the system information update,
a re-synchronization reference signal for UE synchronization in discontinuous reception (DRX) mode and indicating the system information update, or
a layer 3 (L3) intra-frequency measurement gap if an SSB is not transmitted in the active downlink BWP.

22. The apparatus of claim 21, wherein the configuration is comprised in system information dedicated for the UEs having the first capability or in radio resource control (RRC) signaling for the UE.

23. The apparatus of claim 1, wherein a configuration of the active downlink BWP or the active uplink BWP is based on a rule or look up table.

24. The apparatus of claim 1, wherein the at least one processor is further configured to:
perform a capability signaling procedure indicating that the UE has the first capability, wherein the at least one processor is configured to switch to the active downlink BWP and the active uplink BWP after completing the capability signaling procedure and based on at least one of:
a medium access control-control element (MAC-CE),
a radio resource control (RRC) reconfiguration,
downlink control information (DCI), or
a timer configured in system information for the UEs having the first capability.

25. An apparatus for wireless communication at a network entity, comprising:
a memory; and
at least one processor coupled to the memory and, based at least in part on stored information in the memory, the at least one processor is configured to:
perform an initial access with a user equipment (UE) having a first capability associated with a lower maximum UE bandwidth than a second capability, at least part of the initial access using a first initial downlink bandwidth part (BWP) that is shared among UEs having the first capability and UEs having the second capability; and switch, for communication with the UE after the at least part of the initial access, to an active downlink BWP and an active uplink BWP that are dedicated for the UEs having the first capability.

26. The apparatus of claim 25, wherein the at least one processor is configured to perform the initial access using the first initial downlink BWP that is shared among the UEs having the first capability and the UEs having the second capability and using a second initial downlink BWP that is dedicated for the UEs having the first capability, wherein the first initial downlink BWP includes a control resource set 0 (CORESET 0) and cell-defining synchronization signal block (CD-SSB) that is configured for the UEs having the first capability and the UEs having the second capability.

27. The apparatus of claim 26, wherein the at least one processor is further configured to:

output for transmission a first configuration of the second initial downlink BWP that is dedicated for the UEs having the first capability, wherein the first configuration of the second initial downlink BWP is received within the first initial downlink BWP, in a system information block (SIB) carrying information for the UEs having the first capability and the UEs of the second capability, wherein the second initial downlink BWP that is dedicated for the UEs having the first capability does not include the CORESET 0 or the CD-SSB.

28. The apparatus of claim 26, wherein after the at least part of the initial access, the at least one processor is configured to obtain a random access preamble during a random access occasion (RO) in the second initial downlink BWP, the RO having a synchronization signal block (SSB)-to-RO mapping to the CD-SSB in the first initial downlink BWP.

29. The apparatus of claim 26, wherein the at least one processor is further configured to:

output for transmission a configuration for a non-cell-defining SSB (non-CD SSB) in the active downlink BWP dedicated for the UEs having the first capability, the non-CD SSB being for at least one of a layer 1 (L1) or a layer 3 (L3) measurement for the UEs having the first capability.

30. The apparatus of claim 26, wherein the at least one processor is further configured to:

output for transmission system information update in radio resource control (RRC) signaling in the active downlink BWP dedicated for the UEs having the first capability.

* * * * *